Dec. 16, 1941.   G. H. HARRED   2,266,550
WIRE-STITCHING MACHINE
Filed April 16, 1940   11 Sheets-Sheet 1

Inventor:
George H. Harred
By
Attorneys

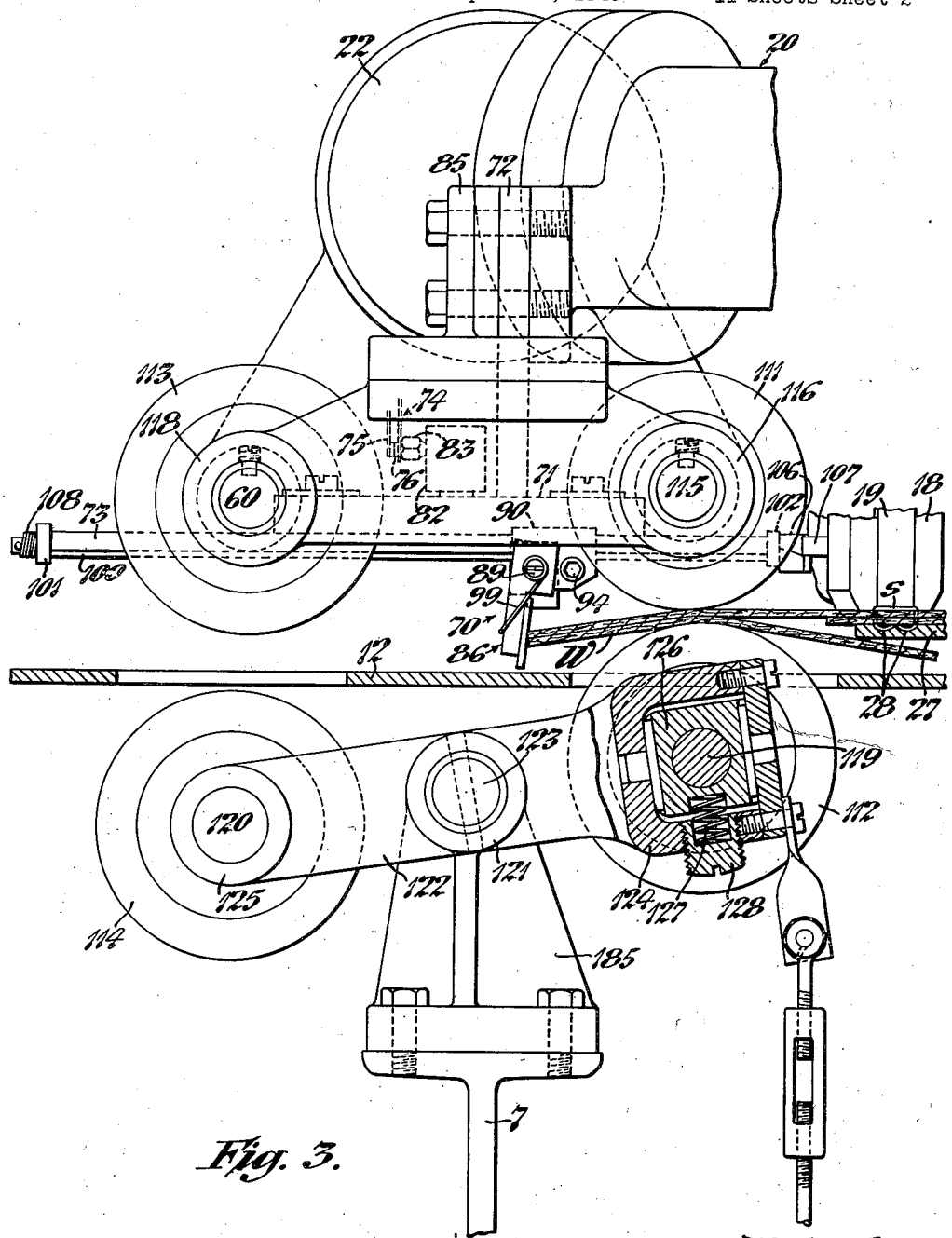

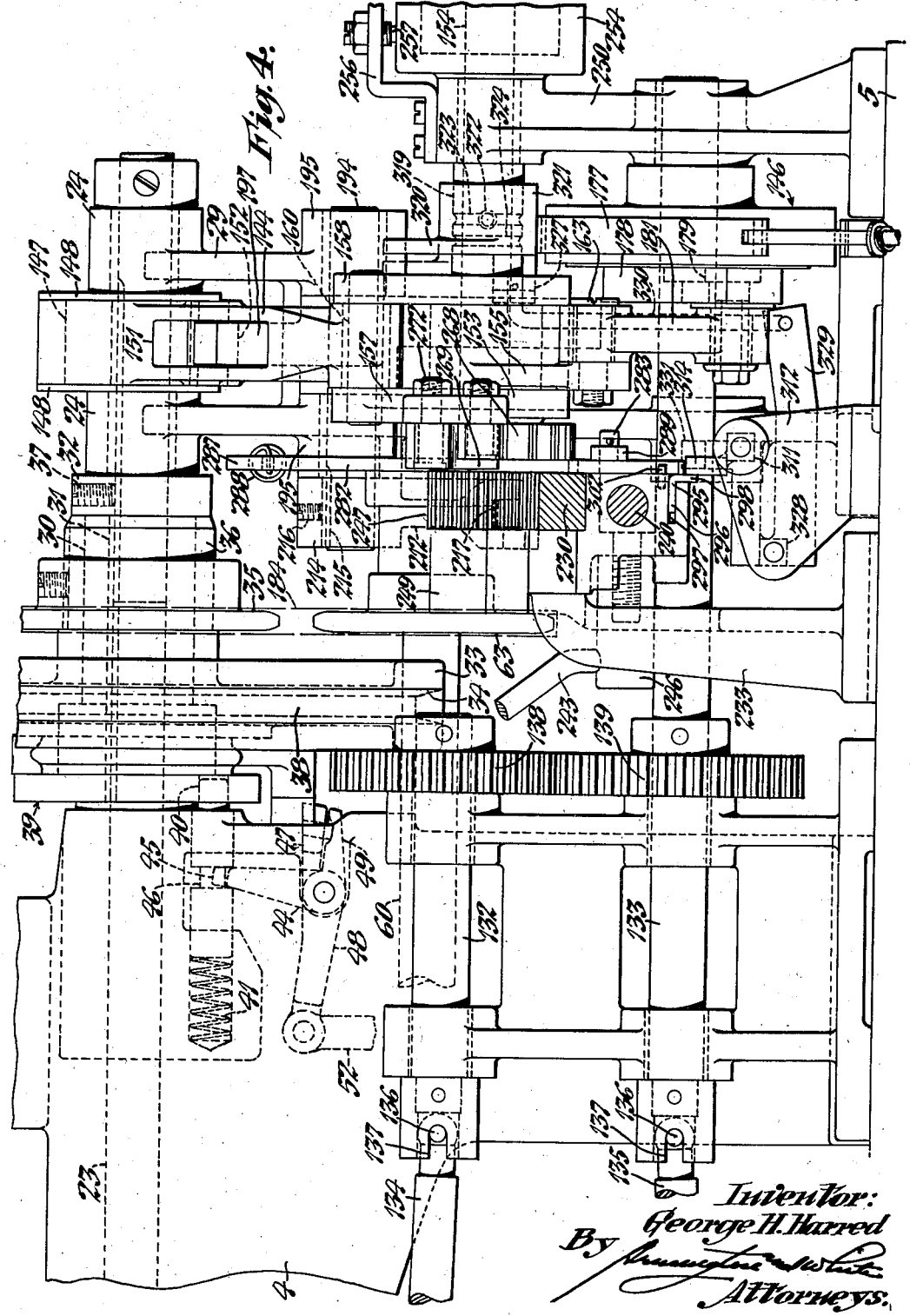

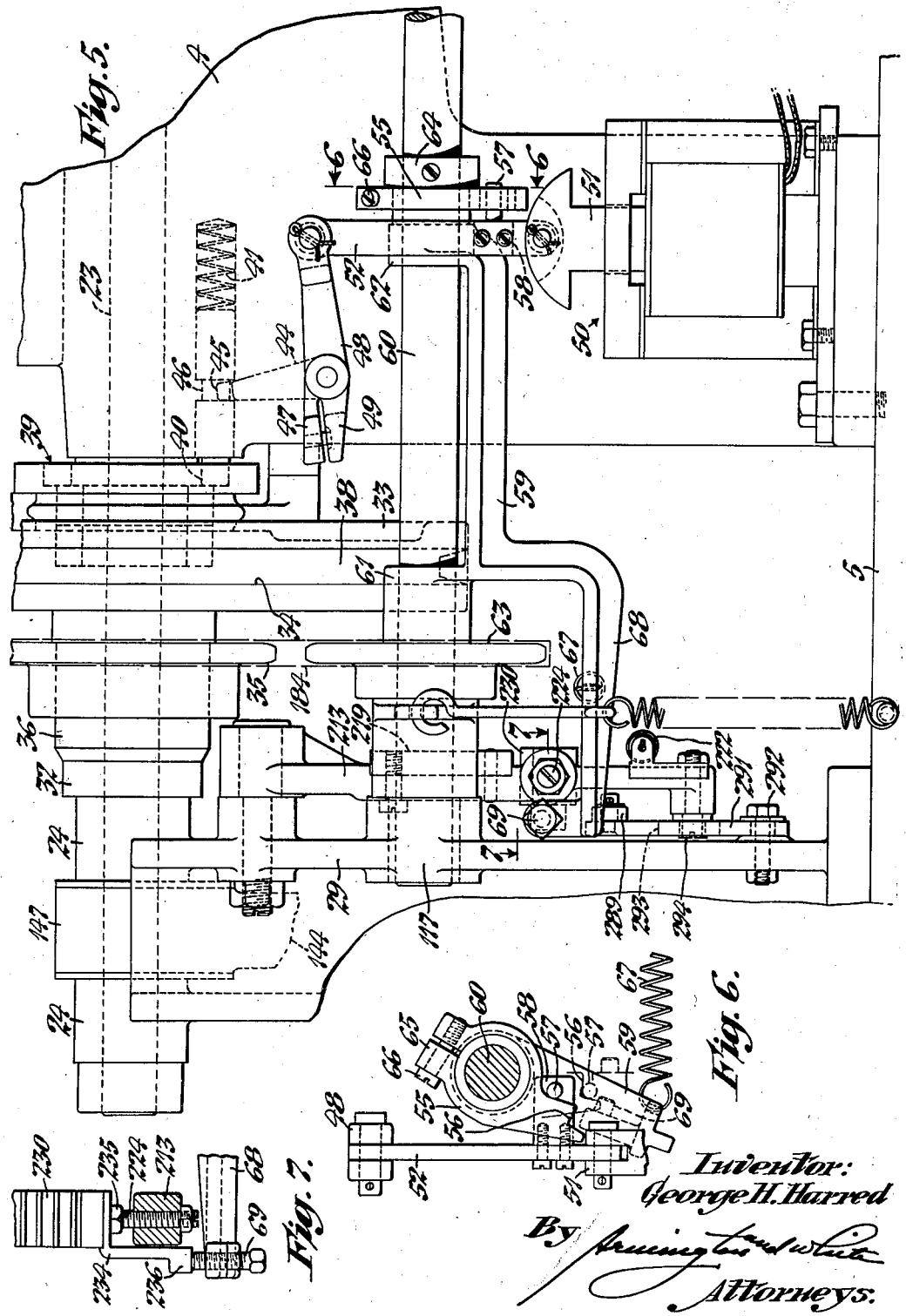

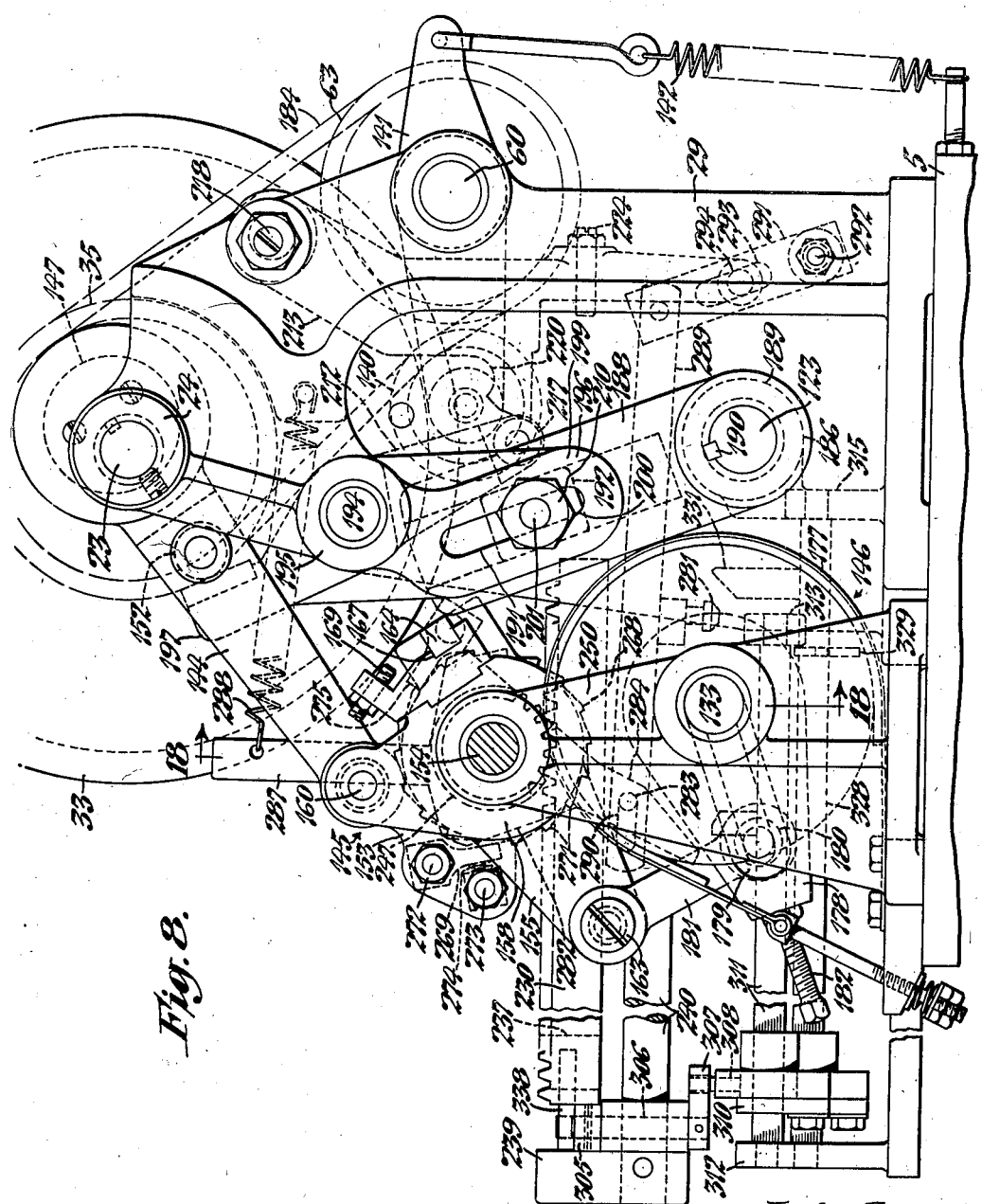

Dec. 16, 1941.  G. H. HARRED  2,266,550
WIRE-STITCHING MACHINE
Filed April 16, 1940   11 Sheets-Sheet 6

Inventor:
George H. Harred
By
Attorneys.

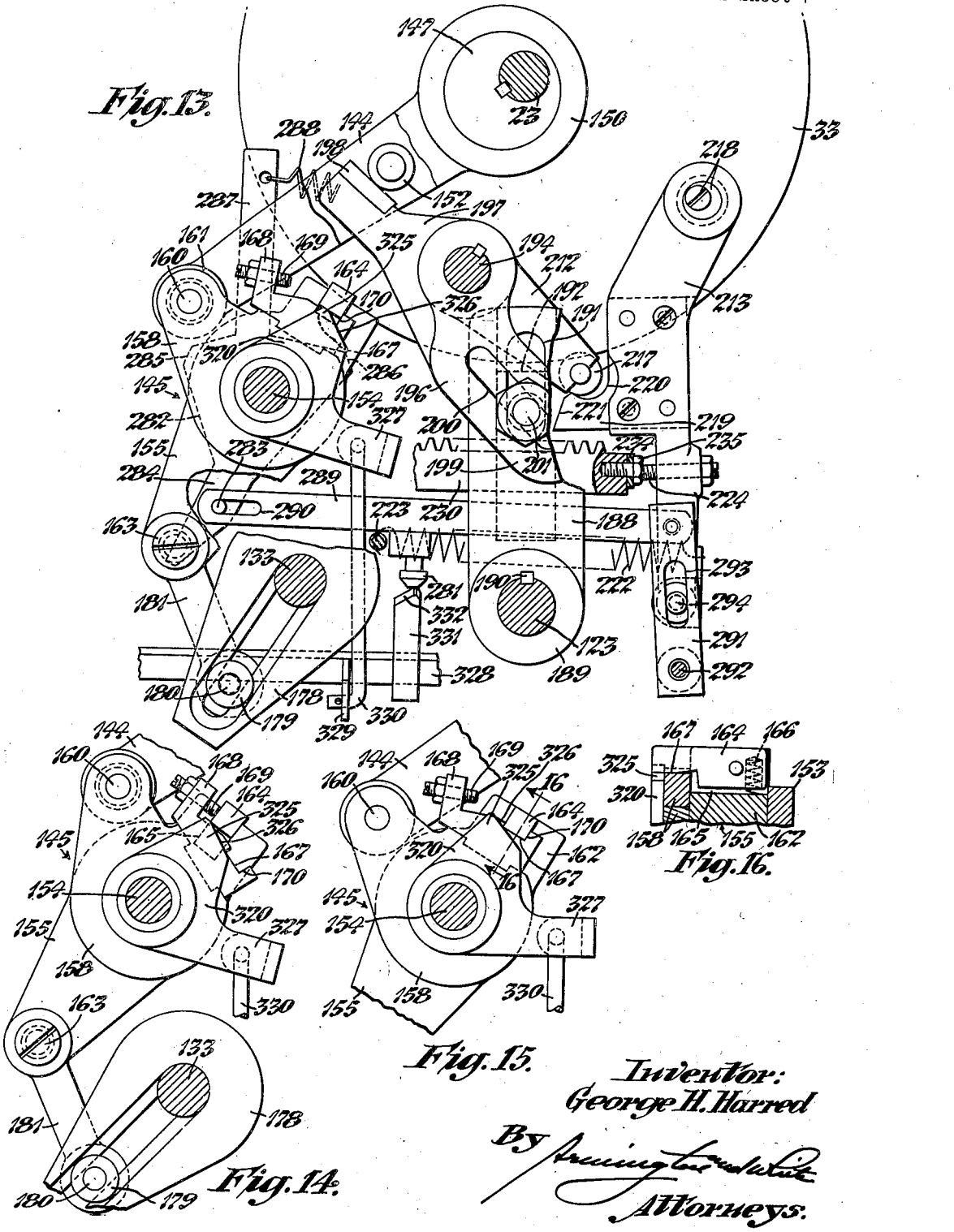

Dec. 16, 1941.     G. H. HARRED     2,266,550
WIRE-STITCHING MACHINE
Filed April 16, 1940     11 Sheets-Sheet 8

Inventor:
George H. Harred
By *Pennington...*
Attorneys.

Dec. 16, 1941.  G. H. HARRED  2,266,550
WIRE-STITCHING MACHINE
Filed April 16, 1940  11 Sheets-Sheet 9

Inventor:
George H. Harred
By Pennington White
Attorneys

Dec. 16, 1941.    G. H. HARRED    2,266,550
WIRE-STITCHING MACHINE
Filed April 16, 1940    11 Sheets-Sheet 10

Inventor:
George H. Harred
By Pennington White
Attorneys.

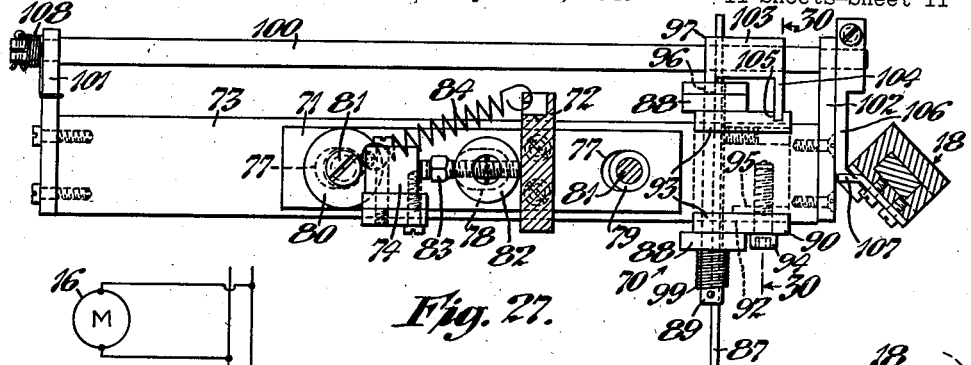

Patented Dec. 16, 1941

2,266,550

UNITED STATES PATENT OFFICE 2,266,550

WIRE-STITCHING MACHINE

George H. Harred, East Greenwich, R. I., assignor to Boston Wire Stitcher Company, Portland, Maine, a corporation of Maine Application April 16, 1940, Serial No. 329,912

43 Claims. (Cl. 1—11)

The present invention relates to stapling or wire-stitching machines for stitching the seams of boxes and cartons and for various other purposes.

One of the objects of the present invention is to provide a machine of the type indicated adapted to set a series of equally spaced stitches in the work either with or without a tie-stitch at each end of the series.

Another object of the invention is to provide a machine of the type indicated in which operation of the stitching mechanism is initiated by the placing of the work and automatically arrested after a predetermined number of stitches have been applied thereto.

Another object of the invention is to provide a machine of the type indicated having electrically controlled means for initiating a stitching operation.

Another object of the invention is to provide a machine of the type indicated having stopping means controlled from the operation of the stitching mechanism.

Another object of the invention is to provide a machine of the type indicated in which the control means for operating the stopping means is adjustable to vary the number of stitches applied in a series.

Another object of the invention is to provide a machine of the type indicated having step-feed means for advancing the work predetermined increments in timed relation to the operation of the stitching mechanism and continuously operated means for discharging the work after a stitching operation.

Another object of the invention is to provide a machine of the type indicated in which the step-feed means is adjustable to vary the spacing between the stitches.

Another object of the invention is to provide a machine of the type indicated having tie-stitch mechanism automatically operable to decrease the increment of feeding movement of the work by the step-feed means between certain stitches.

Still another object of the invention is to provide a machine of the type indicated capable of convenient adjustment to adapt it for different types of cartons or the like to be stitched and one which is efficient in performing its intended functions.

Further objects of the invention are set forth in the following specification which describes a preferred form of construction of the machine, by way of example, as illustrated by the accompanying drawings. In the drawings:

Fig. 3 is an elevational view of the left-hand end of the machine as viewed in Fig. 1 showing the step-feed rolls in operative position for advancing the work and the continuously operated discharge rolls in inoperative position;

Fig. 4 is a front elevational view partly in section showing the operating means for the various elements of the machine;

Fig. 5 is an elevational view of the rear of the machine showing the means for starting and stopping the stitching operation;

Fig. 6 is a transverse sectional view taken on line 6—6 of Fig. 5 showing the means for latching the clutch-operating mechanism;

Fig. 7 is a plan view taken on line 7—7 of Fig. 5 showing the control rack for actuating the latch to release the clutch-operating mechanism;

Fig. 8 is a view of the right-hand end of the machine as viewed in Fig. 1 showing the relationship of the parts when the machine is inoperative;

Fig. 13 is a view similar to Fig. 9 showing the relationship of the parts near the end of a stitching operation and illustrating the tie-stitch cam in operative positon to disengage the driving key;

Fig. 14 is a partial view similar to Fig. 13 indicating the lost motion in the driving means for the step-feed rolls which operates to produce a tie-stitch;

Fig. 15 is a partial view similar to Fig. 14 showing the tie-stitch cam moved to inoperative position and illustrating the key connecting the separate parts of the driving means to cause them to operate as a unit.

Fig. 16 is a sectional view taken on line 16—16 of Fig. 15 showing the key in side elevation;

Fig. 27 is a plan view partly in section of the work-operated gauge for controlling the starting means;

Fig. 28 is a side elevation of the work-operated gauge shown partly in section and illustrating the parts in operative position;

Fig. 29 is a view similar to Fig. 28 showing the movable plate as operated by the work to close the electric switch;

Fig. 30 is a transverse sectional view taken on line 30—30 of Fig. 27 showing the work-operated gate latched in vertical position;

Fig. 31 is a view similar to Fig. 30 showing the latch as moved to release the gate to permit it to swing;

Fig. 32 is a sectional view taken on line 32—32 of Fig. 30 showing the ear on the latch member in locking engagement with a shoulder on the gate;

Fig. 33 is a sectional view taken on line 33—33 of Fig. 31 showing the gate swung on its pivot to ride over the work;

Fig. 34 is a diagrammatical view illustrating the electrical circuit including the solenoid for operating the starting means.

The machine incorporating the present invention comprises, in general, continuously-operated driving means, driven means for operating the stitching mechanism and a clutch for coupling and uncoupling the driving and driven means. The operation of the stitching means is initiated by a work-actuated gauge which closes an electrical circuit including an electromagnet for operating the clutch. The work is advanced predetermined increments of movement by step-feed rolls intermittently rotated in timed relation to the stitching mechanism through an oscillating control mechanism actuated from the driven shaft. A rack operated simultaneously by the oscillating mechanism with a step-by-step movement operates a clutch-uncoupling means at the end of a stitching operation. Means are provided for initially adjusting the position of the rack with respect to the clutch-uncoupling means to govern the period of operation and thereby the number of stitches applied to the work and means controlled by the movement of the rack returns the latter to its initial position. Tie-stitch mechanism, also controlled by the movement of the rack, operates selective connecting means in the oscillating mechanism to govern the increment of movement of the work by the step-feed rolls between certain stitches.

*Frame*

Figure 1:
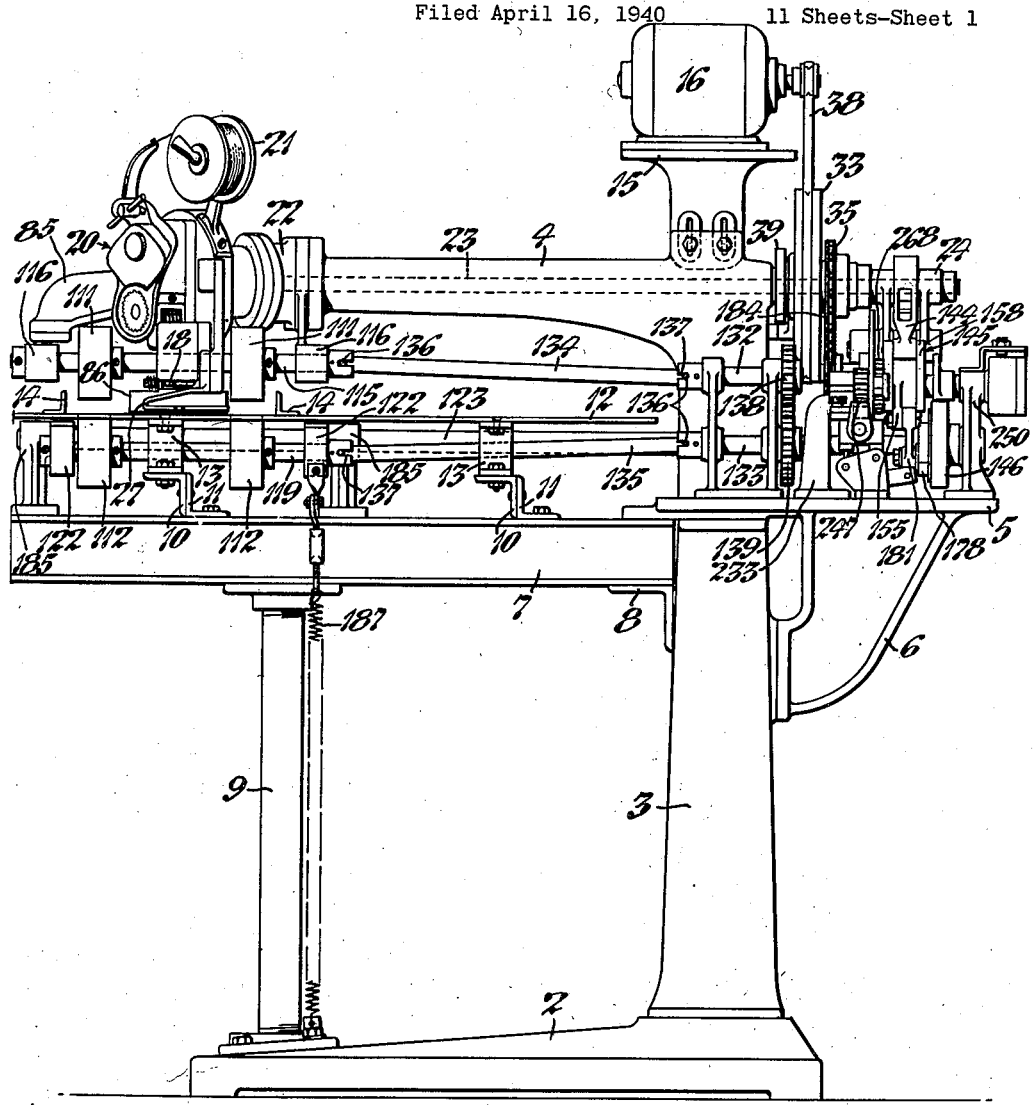
Fig. 1 is a front elevational view of a machine incorporating the novel features of the present invention.

The frame of the machine, illustrated in Fig. 1, comprises a pedestal having a base 2, column 3, and a horizontally extending arm 4 at the upper end of the column. Projecting laterally from one side of the column 3 is a platform or shelf 5 supported in part by a bracket 6. Projecting laterally from the opposite side of the column 3 is an I-beam 7 which underlies the horizontally extending arm 4. The I-beam 7 is supported on the column 3 at its inner end by a bracket 8 and intermediate its ends by a post 9 rising from the base 2. Angle-irons 10 extending transversely of the I-beam 7 are mounted in spaced relationship thereon by angle-brackets 11 and the angle-irons in turn support a table 12 by means of intermediate brackets 13. Clamped to the top of the table 12 are angular work-guides 14 which are adjustable thereon to properly position a carton or other work W to be stitched. Adjustably mounted on the top of the arm 4 above the column 3 is a platform 15 for supporting a prime mover, herein illustrated as an electric motor 16.

*Wire-stitching means and drive therefor*

Figure 2:
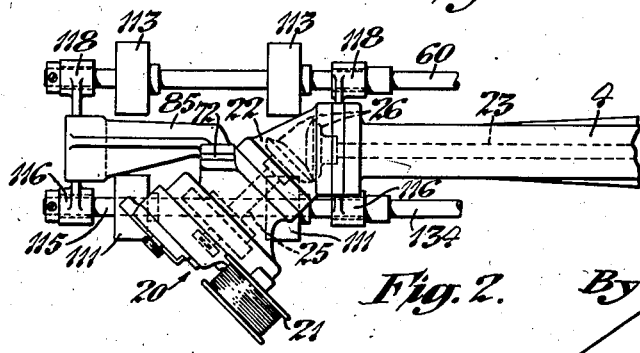
Fig. 2 is a partial plan view showing the wire-stitching mechanism angularly mounted at the end of a supporting arm on the machine frame.

The wire-stitching mechanism or stitching head 20 may be of any known form of construction and, as illustrated in Figs. 1 and 2, is of the type shown and described in the United States Letters Patent to H. G. Allen, No. 1,760,031, issued May 27, 1930. Suffice it to state herein that the stitching head 20 feeds predetermined lengths of wire from a reel 21 and embodies a relatively reciprocating former 18 and driver 19, see Fig. 3, which operate to sever the lengths of wire from the supply, form the wire into U-shaped staples s and drive the formed staple into the work W. As is common with this type of stitching head 20 a length of wire is severed, formed and driven during the first half of the cycle of operations and another length of wire is fed and the former 18 and driver 19 returned to first position during the second half of the cycle.

As illustrated most clearly in Fig. 2, the stitching head 20 is positioned at a 45° angle with respect to the axis of the arm 4 and is mounted at the end thereof by means of an angular casing or hollow coupling 22. Depending from the stitching head 20 is an anvil-tongue flap-guide 27 of usual construction for properly locating the flap and edge of a carton blank or the like in position to receive a stitch and having clincher grooves 28 for clinching the legs of the driven staples s.

The stitching head 20 is operated by a driven shaft 23 journaled in suitable bearings in the arm 4 with one end projecting into the coupling 22 and its opposite end projecting outwardly from the arm 4 beyond the column 3, the outer end of the shaft 23 being supported by suitable outboard bearings 24 carried by the web of a standard or bracket 29 fastened to the platform 5, see Fig. 5. A shaft 25 projects from the rear of the stitching head 20 into the angular coupling 22 and the two shafts 23 and 25 are rotatably connected by intermeshing beveled gears 26 at their ends, see Fig. 2. The shaft 23 is driven by a belt-pulley 33 in the form of a flywheel which is coupled thereto and uncoupled therefrom by means of an intermediate clutch 39. To this end a sleeve 30 mounted on the outwardly extending end of the shaft 23 is connected for rotation therewith by means of a key 31, see Figs. 4 and 5, the sleeve 30 being held against movement axially of the shaft 23 by the end of the bearing in the arm 4 and a collar 32 on the shaft. The flywheel-pulley 33 is mounted to rotate freely on the sleeve 30 and has a peripheral groove 34 for receiving a V-belt. Mounted on a laterally projecting hub portion 36 of the flywheel-pulley 33 is a sprocket 35 keyed to rotate therewith by means of a set-screw 37. The flywheel-pulley 33 is continuously driven by the motor 16 through a V-belt 38, see Fig. 1. The clutch 39 for coupling and uncoupling the flywheel-pulley 33 and shaft 23 is of the type illustrated and described in the United States Letters Patent to A. H. Maynard, No. 1,495,342, issued May 27, 1924. Suffice it to state herein that the clutch 39 is normally held inoperative or disconnected by a pin 40 projected thereinto under tension of a spring 41 and is operative to couple the flywheel-pulley 33 to the shaft 23 when the pin 40 is withdrawn against the action of the spring 41, see Figs. 4 and 5. Thus, when the pin 40 is projected into the clutch 39, as illustrated in Fig. 5, the flywheel-pulley 33 rotates freely on the sleeve 30 keyed to the shaft 23; but when the pin is withdrawn the clutch couples the flywheel-pulley to the sleeve and the shaft 23 actuates the stitching mechanism in the head 20 to form and drive a staple s during each revolution of the shaft. The construction and arrangement of the clutch is such as to positively stop the stitching mechanism when the driver and former are at the upper ends of their stroke whereby to start and stop the stitching operation at a fixed point in its cycle of operation.

*Starting and stopping means*

As illustrated most clearly in Fig. 5, the pin 40 for controlling the clutch 39 is arranged to be operated by a bell-crank lever 44 having one arm 45 projecting into an annular recess 46 in the pin and its other arm 47 projecting at an angle thereto. The bell-crank lever 44 is rocked by a lever 48 pivotally mounted on the same axis and having an arm 49 interlocking with the arm 47 of the bell-crank lever. The lever 48 is rocked on its pivot by means of a solenoid 50 having its plunger 51 connected to the lever 48 by means of a link 52. Thus, when the solenoid 50 is energized the plunger 51 is drawn thereinto and caused to operate through the link 52, lever 48 and arms 45 and 47 of the bell-crank lever to withdraw the pin 40 from the clutch 39 against the action of the spring 41.

After the pin 40 has been withdrawn from the clutch 39 an automatically-operated latch-mechanism acts to hold it inoperative. As illustrated in Figs. 5 and 6, the automatically-operable latch-mechanism comprises a rockable arm 55 having a latching shoulder 56 engageable with a pin 57 carried by a bracket 58 projecting laterally from the link 52. The arm 55 is carried by a fork-like member 59 rockably mounted on a shaft 60. The forked member 59 has spaced bearings 61 and 62 embracing the shaft 60 and is held against axial movement thereon between a sprocket 63 and collar 64 fast on the shaft. The arm 55 has a split hub 65 embracing the bearing 62 and is clamped in adjusted position thereon by a binder-screw 66 to position the latching shoulder 56 to engage the pin 57.

The member 59 is normally rocked by a spring 67 to engage the latching shoulder 56 on the arm 55 with the pin 57 on the link 52, see dash lines in Fig. 6, when the solenoid 50 operates the link to withdraw the pin 40 from the clutch 39. Thus, the shaft 23 and stitching mechanism 20 driven thereby will continue to operate until the member 59 is rocked in the opposite direction to release the latching shoulder 56 from engagement with the pin 57 on the operating link 52. The pin 40 will then be released to allow the spring 41 to project it into the clutch mechanism to uncouple the flywheel-pulley 33 and driven shaft 23. The rockable member 59 and arm 55 thus constitute a stopping means and the member 59 has an arm 68 projecting beyond the bearing 61 with an adjustable abutment in the form of a set-screw 69 for engagement by a movable control means, to be described later, to stop the machine.

*Work-operated gauge for initiating operation*

The starting means is controlled by a work-operated gauge 70 which acts to close an electrical circuit including the solenoid 50, see Figs. 3 and 34. As illustrated in detail in Figs. 27 to 33, the gauge 70 comprises a fixed plate 71 supported at the lower end of a bracket 72 depending from the stitching head 20, see Figs. 2 and 3, and a relatively movable plate 73. The fixed plate 71 mounts a switch 74 which, for purposes of illustration, is shown as of simple push-button type having a fixed contact 75 and a movable contact 76. The fixed plate 71 is also provided with a pair of oval slots 77 adjacent its ends and a centrally located oval slot 78.

The movable plate 73 is positioned below the fixed plate 71 and is slightly wider than the latter to provide side portions projecting beyond the sides of the fixed plate. The movable plate 73 is slidably mounted on the fixed plate 71 by means of hollow studs 79 projecting upwardly through the oval slots 77 in the fixed plate and having washers 80 at the top overlying the top of the fixed plate. The studs 79 and washers 80 are shown as separate elements attached to the movable plate 73 by screws 81 and the construction is such as to permit a limited relative sliding movement between the plates. The lower movable plate 73 also carries a hollow post 82 projecting upwardly through the oval slot 78 in the fixed plate 71 and having an adjustable abutment 83 in the form of a set-screw for operating the movable contact 76 to close it against the fixed contact 75. The movable plate 73 is yieldingly held in its forward position with respect to the fixed plate 71, as illustrated in Fig. 28, by means of a spring 84 having one end anchored to the depending bracket 72 and its opposite end attached to one of the washers 80 carried by the movable plate, see Fig. 27.

A pivoted gate 86 depends from the movable plate 73 in position to be engaged by a carton W or other work to be stitched. As illustrated most clearly in Fig. 30, the gate 86 comprises a transverse squaring plate 87 having spaced arms 88 pivotally mounted on the opposite projecting ends of a stud 89. The stud 89 is carried by a block 90 slotted at 92 to receive the movable plate 73 on which it is mounted. Inwardly-projecting flanges 93 at the upper edges of the slot 92 in the block 90 overlie the upper edges of the movable plate 73 which project beyond the sides of the fixed plate 71. Thus, the block 90 and depending gate 86 may be moved to any position of adjustment throughout the entire length of the movable plate 73. The block 90 is clamped in its adjusted position on the movable plate 73 by means of a screw 94, one end of the block being slotted longitudinally at 95 to adapt its side to yield to bind against the movable plate.

The depending gate 86 is normally swung to the position illustrated in Fig. 29 by a spring 99 coiled about one of the projecting ends of the stud 89 and having one end attached thereto and its opposite end bearing against one of the arms 88 of the gate, the engagement of the upper edge of the plate 87 with the bottom face of the block 90 limiting its swinging movement in a forward direction. The gate 86 is held in vertical position, after the action of the spring 99, by the locking engagement of an ear 96 on a rockable latching member 97 with a shoulder 98 on one of the arms 88 of the gate, see Figs. 30 and 32. The latching member 97 is mounted on a square shaft 100 extending parallel to the movable plate 73 and having cylindrical ends journaled in brackets 101 and 102 carried at the ends of the movable plate, see Figs. 27 and 28. The latching member 97 has a hub 103 embracing the shaft 100, and extending laterally from the hub 103 at the end opposite from the latching member is a wing or arm 104 rockable in a slot 105 in the block 90. The arm 104 acts as a key in the slot 105 to slide the hub 103 and latching member 97 along the square shaft 100 when the block 90 is slide along the movable plate 73 to adjust it in position. Clamped to the projecting end of the shaft 100 is a lever 106 which underlies a projection 107 reciprocable with the former 18 of the wire-stitching mechanism. A spring 108 is coiled about the opposite projecting end of the square shaft 100 with one end engaging the bracket 101 and its opposite end connected to the shaft to normally rock the latter to raise the lever 106.

From the foregoing description it will be observed that the block 90 carrying the depending gate 86 may be moved along the movable plate 73 to any desired position whereby the seam of the carton W to be stitched is properly positioned below the stapling mechanism or head 20. Engagement of the edge of the carton W with the squaring plate 87 of the depending gate 86, as indicated in Fig. 32, causes the movable plate 73 and abutment 83 thereon to move relatively to the fixed plate 71 to actuate the movable contact 76 into engagement with the fixed contact 75 of the switch 74 as shown in Fig. 29. Closing of the contacts 75 and 76 energizes the circuit 109 including the solenoid 50, see Fig. 34, for operating the starting means to cause a staple s to be driven into the work W. During the descent of the former 18 of the stitching mechanism 20 the projection 107 movable therewith engages the lever 106 and rocks the square shaft 100 to the position illustrated in Fig. 31. This causes the ear 96 of the latch member 97 to be moved laterally out of engagement with the shoulder 98 on the arm 88 of the gate 86 to permit the latter to rock on the pivot stud 89. Thereafter, the depending gate 86 is swung to the position illustrated in Fig. 33 by the movement of the carton W thereunder and the movable plate 73 is slid to initial position by the spring 84 whereby the contact 76 moves away from the contact 75 to open the circuit 109. After the completion of a stitching operation the gate 86 is swung to its vertical position illustrated in Fig. 29 by the coil-spring 99 and the square shaft 100 is rocked by the coil-spring 108 to engage the ear 96 of the latch member 97 with the shoulder 98 on the gate 86.

When the machine is used for stitching the seams of folded carton blanks W, as illustrated in the drawings, the depending gate 86 of the gauge 70 acts as a squaring device to aline the edges of the folded sides with the edge of the main portion of the blank. Due to the locking engagement of the ear 96 of the latch 97 with the shoulder 98 on the gate 86 the latter is held in its depending vertical position illustrated in Fig. 29 until the stitching head 20 has been operated to drive a staple s. As a carton blank W is inserted into the machine the operator holds one of the folded sides in each hand at their rearward edges and presses the carton forwardly. The engagement of the forward edge of the main portion of the carton blank W with the vertical squaring plate 87 of the depending gate 86 properly positions the seam of the folded sides to cause it to move in a path square with the stitcher head. The operator by pressing forwardly on the folded sides of the carton blank W causes their forward edges to also engage the squaring plate 87 to square the folded sides with the main portion of the blank.

It may sometimes happen that the forward edges of the folded sides project beyond the forward edge of the main portion of the carton blank W, in which case the operator forces the main portion of the blank forwardly to cause the forward edges of the folded portion to be brought into alinement with the edge of the main portion. Thus, the depending gate 86 of the gauge 70 besides functioning to initiate the operation of the stitching head 20 also operates to square the folded sides with the main portion of the blank.

*Work-feed and discharge means and drive therefor*

In accordance with the present invention the work W is intermittently fed predetermined increments of movement in timed relation to the operation of the stitching mechanism by opposite pairs of step-feed rolls 111 and 112; and after a stitching operation the work is discharged from the machine by opposite pairs of continuously-operated rolls 113 and 114. As illustrated in Figs. 1 and 3, the step-feed rolls 111 of the upper pair are arranged in spaced relationship on a shaft 115 mounted in spaced bearings 116 carried by a bracket 85 depending from the head 20 on the arm 4 of the frame. The discharge rolls 113 of the upper pair are similarly arranged on the shaft 60, previously referred to, spaced rearwardly of the shaft 115. The shaft 60 is journaled at one end in a bearing 117 carried by the web of the bracket 29, see Fig. 3, and at its opposite end in spaced bearings 118 of the same construction as the bearings 116, see Fig. 3. The lower pairs of step-feed rolls 112 and discharge rolls 114 are arranged in spaced relationship on shafts 119 and 120, respectively, carried by a rockable cradle 121. The cradle 121 has spaced crossarms 122 pinned to a rock-shaft 123 and each crossarm has bearings 124 and 125 at its outer ends in which the shafts 119 and 120 are journaled with the rolls 112 and 114 fast thereon between the arms. Thus, by rocking the shaft 123 in a counterclockwise direction, as viewed in Fig. 3, the lower pair of step-feed rolls 112 are brought into cooperative relationship with the upper step-feed rolls 111 to grip the work therebetween. When the rock-shaft 123 is rocked in a clockwise direction, as viewed in Fig. 3, the lower pair of discharge rolls 114 are brought into cooperative relationship with the upper discharge rolls 113 to engage the work and discharge it from the machine. To provide for a yielding pressure of the lower pair of step-feed rolls 112 against the under side of the work the bearings 124 for their shaft 119 comprise journal-blocks 126 slidably mounted in the bearing housings at the ends of the crossarms 122 and normally held against the upper walls of the housing by means of springs 127. The tension of the springs 127 may be adjusted by means of set-screws 128 to regulate their pressure on the journal-blocks 126 and thereby the pressure of the rolls 112 against the work.

The upper and lower shafts 115 and 119 carrying the upper and lower pairs of step-feed rolls 111 and 112 are driven from shafts 132 and 133 journaled in bearings supported by the machine frame with intermediate shafts 134 and 135 coupled to the ends of said shafts by universal joints, see Fig. 1. As herein illustrated the universal couplings between the shafts comprise transverse pins 136 at the ends of the intermediate shafts 134 and 135 which cooperate with slots 137 in sockets at the ends of the shafts 115, 119 and 132, 133. The shafts 132 and 133 are connected by intermeshing gears 138 and 139, see Fig. 1, of the required ratio to cause the shafts 132 and 133 to turn the shafts 115 and 119 at a rate commensurate with the diameters of the upper and lower step-feed rolls 111 and 112 which may vary in size as shown in Fig. 3. Due to this arrangement the peripheral advance of the opposed upper and lower rolls will be uniform.

As stated above the step-feed rolls 111 and 112 are intermittently operated in timed relation to the wire-stitching means to feed the work W predetermined increments of movement whereby to space the stitches S as they are applied thereto. To this end the shaft 133 is rotated intermittently from the shaft 23 which operates the stitching mechanism 20. As herein illustrated the means for intermittently driving the shaft 133 from the shaft 23 comprise an eccentrically-operated pitman 144, see Figs. 8 and 13, oscillating mechanism 145 and a one-way clutch 146 on the shaft 133, see also Fig. 19. The shaft 23 is provided with an eccentric 147 having side plates 148 attached thereto by means of screws 149 as shown in Fig. 12. An eccentric strap 150 at the end of the pitman 144 embraces the eccentric 147 and is held thereon by the side plates 148. Intermediate its ends the pitman 144 is bifurcated at 151 and has a roller 152 mounted on a pin extending transversely through the sides of the bifurcation and adapted for a purpose to be described later, see Fig. 9.

Referring to Figs. 4 and 8, the opposite end of the pitman 144 is connected to the oscillating mechanism 145 which comprises a member 153 mounted to rock freely on a control shaft 154, later to be described in detail. A crank-arm 155 is mounted to rotate about the axis of the member 153 and adapted to be connected to oscillate therewith. The member 153 has a hub 156, see Fig. 18, with an integral flange 157 at one side thereof and a similar flange or plate 158 connected to the opposite side of the hub by screws 159. The end of the pitman 144 is positioned between the flanges 157 and 158 of the member 153 and is connected thereto by means of a crank-pin 160 extending through bearing apertures in the flanges and a bearing 161 at the end of the pitman. The crank-arm 155 has a bearing portion 162 rockably mounted on the hub 156 of the member 153 between the flanges 157 and 158 and projects downwardly and forwardly from the shaft 154, see Fig. 4. At its outer end the crank-arm 155 has a laterally projecting crank-pin 163.

The flange 158 of the member 153 and the bearing portion 162 of the crank-arm 155 are normally connected by a key 164 for rocking movement as a unit to produce a particular spacing of stitches S, see Fig. 15, but are adapted for relative movement in certain circumstances, see Fig. 14, to form a tie-stitch as explained more fully hereinafter. The key 164 is pivotally mounted in a slot 165 in the bearing portion 162 of the crank-arm 155 and normally it is rocked by a spring 166 to engage its end with a slotted recess or seat 167 in the flange 158 of the member 153, see Fig. 16. The flange 158 is also provided with a shoulder 170 adjacent the seat 167 and an upstanding lug 168 carrying an adjustable set-screw 169 engageable with the side of the key 164 when the latter is withdrawn from the seat to permit lost motion between the parts. Thus, oscillation of the member 153 by the pitman 144 causes the crank-arm 155 to rock therewith as a unit or with lost motion relative thereto depending upon the position of the key 164.

Figure 18:
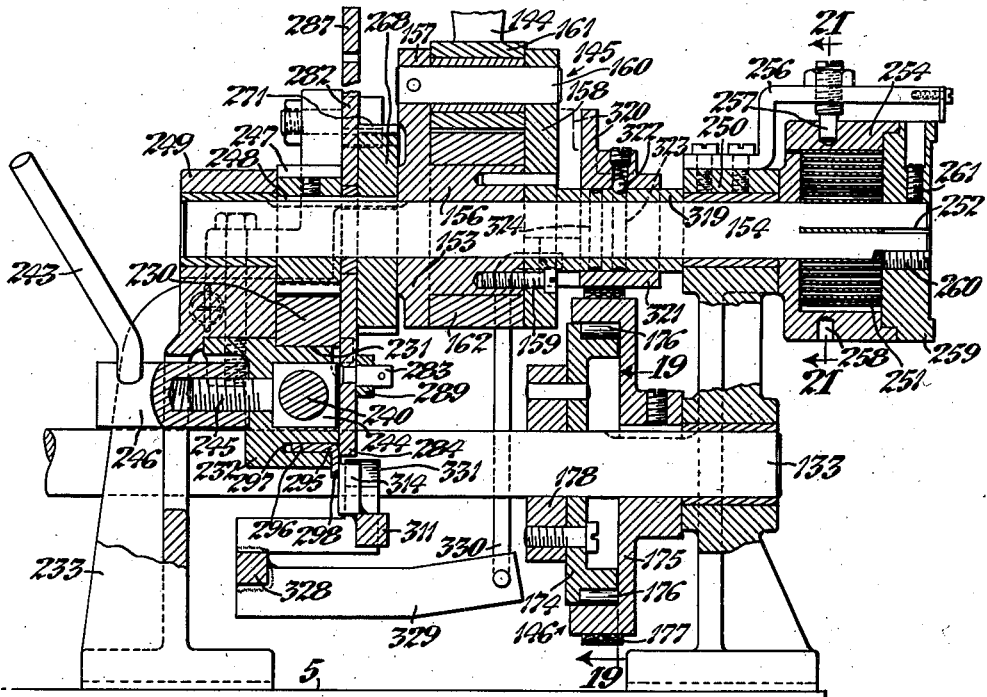
Fig. 18 is a longitudinal sectional view taken on line 18—18 of Fig. 8 showing the operating shaft of the control means for actuating the stopping means.
Figure 19:
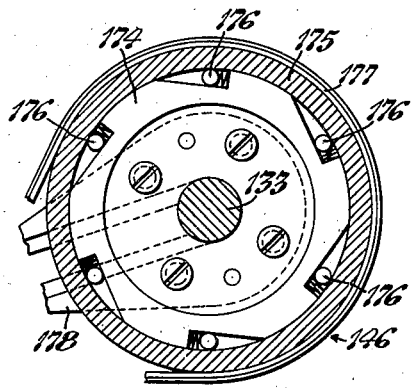
Fig. 19 is a sectional view taken on line 19—19 of Fig. 18 showing the one-way clutch for intermittently operating the step-feed rolls.

The one-way clutch 146 on the shaft 133, see Figs. 18 and 19, is of the type illustrated and described in United States Letters Patent No. 1,513,021 to H. G. Allen, dated October 28, 1924. Suffice it to state herein that the clutch 146 comprises a member 174 rotatable on the shaft 133 and a housing 175 inclosing the member and keyed to the shaft, the parts being connected to rotate as a unit by interengaging spring pressed rollers 176 during rotation of the hub in one direction and the rollers releasing the member from the housing during rotation of the member in the opposite direction. Preferably, a brake-band 177 encloses the outer periphery of the housing 175 to prevent the shaft 133 from moving except when positively driven.

As illustrated in Figs. 8, 10 and 14, the member 174 of the clutch 146 is formed with a slotted crank-arm 178 mounting a block 179 which, in turn, carries a laterally-projecting crank-pin 180 in the form of a screw. The crank-pin 163 on the crank-arm 155 and the crank-pin 180 on the crank-arm 178 on the member 174 of the clutch 146 are connected by a link 181. Thus, rotation of the eccentric 147 on the driven shaft 23 reciprocates the pitman 144 which, operating through the oscillating mechanism 145, rocks the crank-arm 155 and through the link 181 rocks the crank-arm 178 of the member 174 of the clutch 146 in opposite directions through an arc of predetermined degree. The arcuate movement of the member 174 of the clutch 146 is transmitted through the housing 175 in one direction of movement to drive the shaft 133 and through the intermeshing gears 138 and 139 to drive the shaft 132 simultaneously therewith. Rotation of the shafts 132 and 133 is transmitted through the universal couplings and shafts 134 and 135 to turn the step-feed rolls 111 and 112 to feed the work W predetermined increments of movement.

Figure 9:
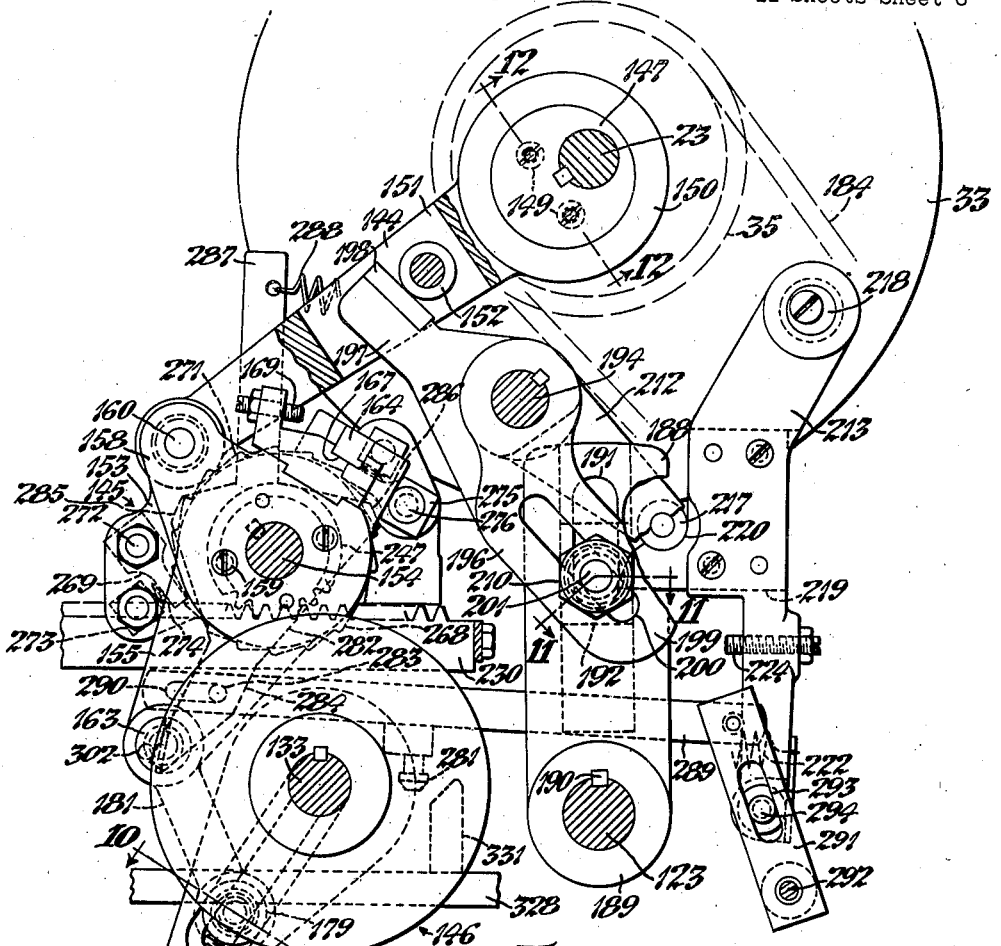
Fig. 9 is a partial view similar to Fig. 8 showing the relationship of the parts after a half revolution of the drive-shaft and illustrating the rock-shaft for the step-feed rolls locked in operative position.
Figures 10, 11, 12:
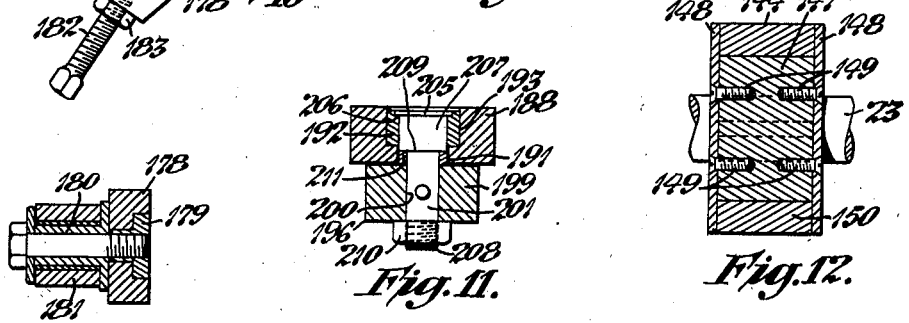
Fig. 10 is a transverse sectional view taken on line 10—10 of Fig. 9 showing the adjustable mounting for the crank-pin of the operating means for the step-feed rolls.
Fig. 11 is a transverse sectional view taken on line 11—11 of Fig. 9 showing the slidable pin for pivotally connecting the levers for operating the rock-shaft carrying the step-feed rolls.
Fig. 12 is a transverse sectional view taken on line 12—12 of Fig. 9 showing the construction of the eccentric driving means.

The arrangement of the rollers 176 in the one-way clutch 146 is such that the member 174 moves free from the housing 175 during the movement of the pitman 144 from the position shown in Fig. 8 to that shown in Fig. 9; but during the return movement of the pitman from the position shown in Fig. 9 to that shown in Fig. 8 the housing is engaged by the rollers to cause it to rotate the shaft 133. In other words, the driven shaft 23 operates the stitching mechanism 20 during the first half of its revolution to drive a staple s and operates the step-feed rolls 111 and 112 during the second half of its revolution to feed the work W while a length of wire is being fed to the stitcher head 20 to be formed into another staple.

To vary the space between stitches S the block 179 carrying the crank-pin 180 on the crank-arm 178 of the clutch-member 174 may be adjusted toward or away from the axis of the shaft 133. This adjustment is accomplished by means of a set-screw 182 having threaded engagement with a tapped hole in the end of the crank-arm 178 with its end engaging the block 179. Thus by turning the set-screw 182 the block 179 may be moved in the slot in the crank-arm 178 toward the axis of the shaft 133 and the screw thereafter locked by a check-nut 183. The block 179 may be locked in position by tightening the screw 180.

The upper pair of discharge rolls 113 carried by the shaft 60 are continuously rotated from the flywheel-pulley 33 by means of a chain 184 connecting the sprocket 35 on the pulley and sprocket 63 on the shaft, an idler sprocket 140 carried by a lever 141 pivotally mounted on the shaft and rocked by a spring 142 operating to tension the chain, see Fig. 8. The opposite set of discharge rolls 114 on the cradle 121 are idlers and merely serve to press the work against the rolls 113.

*Control means for the work-feed and discharge means*

The cradle 121 is rocked in a clockwise direction, as viewed in Fig. 3, by means of a spring 187, see Fig. 1, connected between one of the cross-arms 122 of the cradle and the base 2 of the frame. Through this arrangement the lower pair of discharge rolls 114 are normally held in cooperative relation with the upper pair of discharge rolls 113 and the lower step-feed rolls 112 are drawn downwardly to permit the carton or other work W to be inserted between them and the upper step-feed rolls 111 to engage the depending gate 86. As explained above, engagement of the edge of the carton W with the depending gate 86 causes the clutch 39 to be operated to couple the flywheel-pulley 33 to the driven shaft 23. Rotation of the shaft 23 will then reciprocate the pitman 144 from the position shown in Fig. 8 to that shown in Fig. 9 which, in turn will operate the rock-shaft 123 to engage the step-feed rolls 111 and 112 with the work W by the means as next explained.

The rock-shaft 123 is journaled in spaced bearings 185 at the left-hand end as viewed in Fig. 1, and a bearing 186 at its opposite end, see Fig. 8, supported on the platform 5. Projecting upwardly from the rock-shaft 123 adjacent the bearing 186 is a crank-arm 188, see Figs. 8 and 9, having a hub 189 fixed to the shaft for rotation therewith by means of a key 190. The crank-arm 188 is formed with a longitudinally extending slot 191 and a grooved guideway 193 in which a block 192 is adapted to slide. A lever 196 pivotally mounted on a countershaft 194 journaled in spaced bearings 195, shown in Fig. 4, has one arm 197 projecting into the opening 151 in the pitman 144 with a shoe 198 at its end bearing against the roller 152, see Fig. 9. The opposite arm 199 of the lever 196 overlies the side of the crank-arm 188 and has a longitudinally-extending slot 200. The crank-arm 188 and arm 199 of the lever 196 are pivotally connected by means of a stud or pin 201 mounted on the arm 199 and adjustable in the slot 200.

As illustrated in detail in Fig. 11 the pin 201 has a stepped flange 205 seated in a counterbore 206 in the sliding block 192, a shank 207 extending through the block 192 and a reduced portion 208 extending through the slot 191 in the crank-arm 188 and the slot 200 in the arm 199 of the lever 196 and forming an annular shoulder 209 therebetween. The pin 201 is clamped in adjusted position on the arm 199 of the lever 196 by means of a nut 210, a washer being provided between the shoulder 209 on the pin and the side of the arm to prevent the sliding block 192 from binding in its guideway 193 in the crank-arm 188.

Rocking movement of the rock-shaft 123 from the position shown in Fig. 8 to that shown in Fig. 9 causes the cradle 121 to be rocked against the action of the spring 187 to position the step-feed rolls 112 in cooperative relation to the upper step-feed rolls 111 to grip the carton or other work W therebetween. The degree of rocking movement of the cradle 121 may be varied by changing the relative position of the pivot pin 201 on the arm 199 of the lever 196 whereby to adjust the machine for work of different thicknesses.

Simultaneously with the operation of the lever 196 to rock the shaft 123 an arm 212 on the countershaft 194 is moved into engagement with a pivoted locking member 213 to retain the parts of the cradle operating means in the position illustrated in Fig. 9 during a stitching operation. The arm 212 has a hub 214, see Fig. 4, mounted on the projecting end of the countershaft 194 and atttached thereto for movement therewith by a key 215 and set-screw 216. The arm 212 projects downwardly and rearwardly from the countershaft 194, as illustrated in Figs. 4 and 9, and has a roller 217 in its bifurcated free end. The locking member 213 is pendantly mounted on an eccentric pin 218 to provide for its initial adjustment. A plate 219 mounted on the locking member 213, see Fig. 13, has a recess 220 for receiving the roller 217 on the arm 212 and an inclined cam face 221 positioned forwardly of the recess. The pendantly mounting locking member 213 is yieldingly urged toward the roller 217 to seat the latter in the recess 220 by a spring 222 acting between the lower end of the locking member and a suitable lug 223 on the frame as shown in Fig. 13. Below the plate 219 on the locking member 213 is an adjustable abutment 224 in the form of a set-screw engageable by a movable control means, to be described later, for rocking the locking member against the action of the spring 222 to release the roller 217 on the depending arm 212 from the recess 220. When the locking arm 212 is released the cradle 121 is rocked by the spring 187 back to its initial position illustrated in Fig. 8, but the return movement of the cradle is controlled by the engagement of the shoe 198 on the lever 196 with the roller 152 on the pitman 144.

Control means for the stopping means

The control means for the stopping means comprises a movable member 230 actuated with a step-by-step movement from the driven shaft 23 to operate the stopping means after a predetermined number of stitches S have been applied to the work and to cause the parts to be returned to initial position to start another stitching operation. The movable member 230 is in the form of a gear-rack mounted for sliding movement in a guideway 231 in a bed-block 232 supported by a stanchion 233 projecting upwardly from the platform 5 of the frame 2, see Figs. 18 and 23. As illustrated in Figs. 7 and 8, the rack 230 moves in a direction at right-angles to the axis of the shaft 60 and is so positioned and arranged as to engage the arm 68 of the stopping member 59 which is rockably mounted on the shaft 60 and the abutment 224 of the pendantly mounted locking member 213. The rack 230 has an offset extension 234 attached to its rearward end by means of a screw 235, see Fig. 7, and the extension has an abutment 236 engageable with the adjustable abutment 69 on the arm 68 of the stopping member 59. The head of the screw 235 acts as an abutment engageable with the abutment 224 of the locking member 213. Adjacent its forward end the rack 230 has a recess 237 in one side thereof providing a shoulder 238, see Fig. 22.

An increment of movement of the rack 230 equal to the spacing of its teeth corresponds to one complete revolution of the driven shaft 23 to operate the stitching head 20 to drive one staple s so that the relative position of the rack with respect to the stopping member 59 governs the number of stitches applied during a complete stitching operation. The initial position of the rack 230 is controlled by an adjustable abutment 239, see Figs. 22 and 23. The abutment 239 is in the form of a block carried at the end of a rod 240 slidable in a bearing 241 in the bed-block 232 below the rack 230. As illustrated in Fig. 18, the adjustable abutment 239 may be locked in any adjusted position by means of a clamping member 244 embracing the rod 240 within the bearing 241 and having a screw threaded stem 245 projecting outwardly through the bed-block 232. A nut 246 having an operating handle 243 projecting therefrom is screwed onto the threaded stem 245 and set up against the bed-block 232 to clamp the rod 240 against the side of the bearing 241 to retain the abutment in adjusted position. By turning the nut 246 to loosen it on the threaded stem 245 the rod 240 and abutment 239 mounted thereon may be moved to any position of adjustment and then clamped in place by tightening the nut.

The rack 230 is operated by a pinion gear 247 connected for rotation with the control shaft 154, previously referred to, by a key 248, see Fig. 18. The shaft 154 is mounted for rotation in the bearing 249 in the bed-block 232 and a pedestal bearing 250 supported by the platform 5 of the frame 2 with one end of the shaft projecting outwardly beyond the pedestal bearing. The axis of the control shaft 154 extends at right-angles to the direction of movement of the rack 230 and the pinion gear 247 is so positioned thereon as to cause its teeth to continually mesh with the teeth of the rack. Consequently, rotation of the control shaft 154 in either direction transmits a corresponding longitudinal movement to the rack 230.

Figure 21:
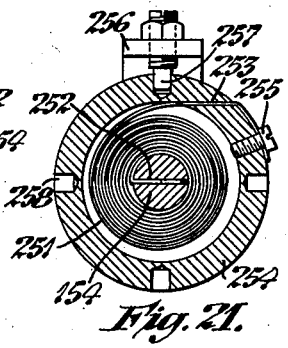
Fig. 21 is a sectional view taken on line 21—21 of Fig. 18 showing the clock-spring for rotating the operating shaft of the control means to return the rack to initial position.
Figures 22, 23, 24, 25, 26:
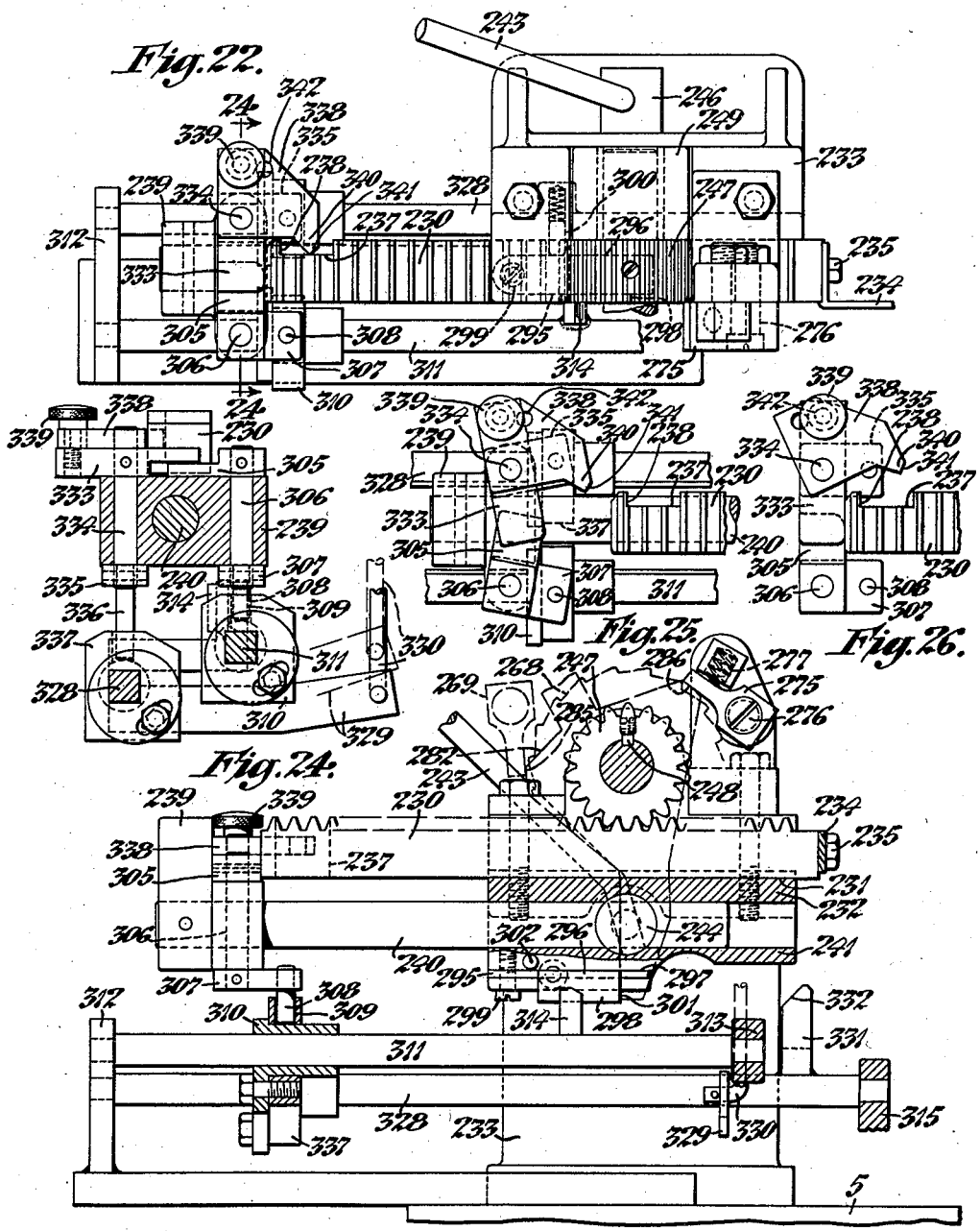
Fig. 22 is a plan view showing the movable control rack in its initial position.
Fig. 23 is a transverse sectional view showing the control rack in side elevation and illustrating the operating means therefor.
Fig. 24 is a sectional view taken on line 24—24 of Fig. 22 showing the operating means for the tie-stitch cam and the ratchet release mechanisms.
Fig. 25 is a partial plan view similar to Fig. 22 showing the tie-stitch control means operated by the rack.
Fig. 26 is a view similar to Fig. 25 showing the tie-stitch control means as manually set in its inactive position.

The control shaft 154 is turned in a clockwise direction as viewed in Fig. 23 by means of a clock-spring 251 coiled around the projecting end of the shaft and normally acting to maintain the forward end of the rack 230 engaged with the abutment 239, see Figs. 18 and 21. The spring 251 has one end locked in a slot 252 in the end of the shaft 154 to connect it thereto and its opposite end extends through a slot 253 in the side of a housing 354, see Fig. 21, being connected thereto by means of a screw 255. The housing 254 incloses the spring 251 and is held against rotation by an angular bracket 256 fastened to the bearing 250 and having a depending stud or pin 257 projecting into one of a series of recesses 258 in the housing. By removing the pin 257 and turning the housing 254 in a clockwise direction, as viewed in Fig. 23, the spring may be wound up to produce any desired tension and the pin thereafter inserted in one of the recesses 258 to hold the housing against rotation.

Figure 20:
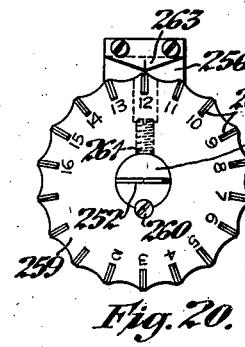
Fig. 20 is an end view of the operating shaft of the control means showing the dial for adjusting the machine to set any predetermined number of stitches in a series.

To provide for initially adjusting the position of the rack 230 with respect to the stopping member 59 a dial 259 is mounted on the end of the shaft 154, the dial cooperating with the open end of the housing 254 to completely inclose the spring 251. The dial 259 is rigidly connected for rotation with the shaft 154 by means of set-screws 260 and 261, the screw 261 also acting to clamp the end of the spring 251 in the slot 252. As illustrated in Fig. 20, the face of the dial 259 is marked with radial graduations 262 spaced apart an angular increment corresponding to the angular movement of the shaft 154 acting through the pinion 247 to slide the rack 230 a longitudinal distance equal to the spacing of its tooth. As will be noted, each of the radial graduations is numbered to indicate the number of teeth the rearward end of the rack is spaced from the stopping member 59 for any particular setting and thus the number of stitches to be set during a stitching operation. The dial and radial graduations thereon are arranged to cooperate with a fixed pointer 263 carried at the end of the bracket 256. To initially set the rack 230 with respect to the stopping member 59 the clamping nut 246 is loosened and the dial 259 and control shaft 154 connected thereto are turned until the proper graduation 262 on the dial indicating the number of staples to be driven is alined with the pointer 263. The abutment 239 is then brought into engagement with the forward end of the rack 230 and the nut 246 turned to clamp the abutment in its adjusted position.

The rack 230 is operated with a step-by-step movement from the driven shaft 23 by means of a ratchet-wheel 268 on the shaft 154 and an indexing or actuating pawl 269 on the oscillating mechanism 145, see Figs. 4, 8, 9 and 18. As illustrated most clearly in Fig. 18, the ratchet-wheel 268 is connected to the control shaft 154 by means of the key 248, previously mentioned, and is positioned adjacent the flange 157 of the oscillating member 153. As illustrated in Fig. 8, the ratchet-wheel 268 has a series of teeth 271 on its periphery for engagement by the pawl 269 carried by the flange 157 of the oscillating member 153. The flange 157 of the oscillating member 153 has an irregularly-shaped ear carrying a laterally projecting pin 272 on which the pawl 269 is pivotally mounted and a second pin 273 providing an abutment for a spring 274 for pressing the pawl into engagement with the ratchet-teeth 271, see Figs. 4 and 8. As illustrated in Fig. 4, the pawl 269 depends from its pivot pin 272 and is slightly wider than the ratchet wheel 268 to overhang the side of the latter. The dimensions of the teeth 271 of the ratchet wheel 268 and parts for operating the same is such that each rotation of the driven shaft 23, operating through the pitman 144 and flange 157 of the oscillating member 153, indexes the ratchet wheel, control shaft 154 and pinion gear 247 through a predetermined arc to advance the rack 230 longitudinally to an extent equal to the distance between its teeth. During the operation of the control shaft 154 by the pawl 269 and ratchet wheel 268 the member 174 of the one-way clutch 146 has a lost motion with respect to the housing 175 whereby the control means operates in advance of the work-feeding means to actuate the stopping member 59 and locking member 213.

A check pawl 275 pivotally mounted on a pin 276 on the bed-block 232 cooperates with the teeth 271 of the ratchet-wheel 268 to hold the control shaft 154 while the oscillating member 153 is moved through a return stroke, see Fig. 9. The check pawl 275 is resiliently pressed toward the periphery of the ratchet-wheel by means of a spring 277, see Fig. 23, in the same manner as explained with respect to the actuating pawl. The actuating pawl 269 and ratchet-wheel 268 continue to be operated during a stitching operation to advance the rack 230 one tooth at a time with a step-by-step motion until the rearward end of the rack 230 is moved into position to operate the stopping member 59 and the pendantly mounted locking member 213.

Figure 17:
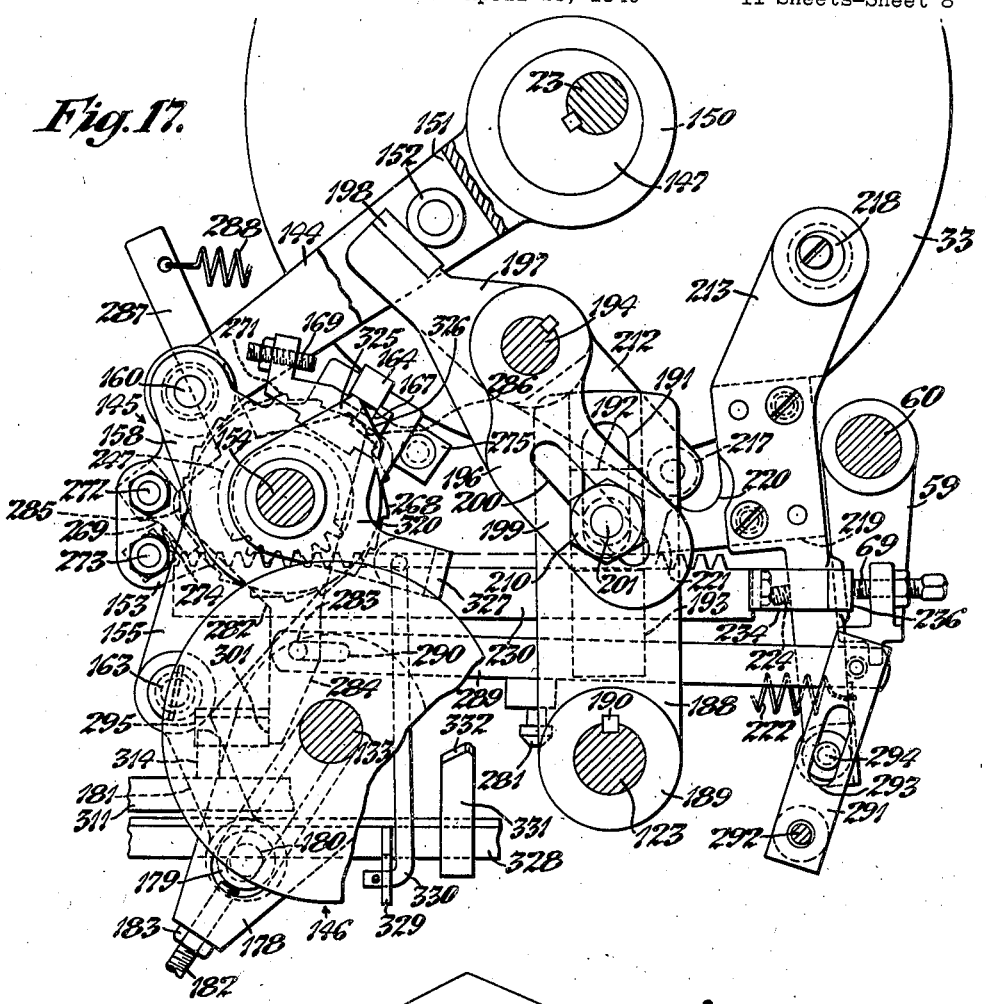
Fig. 17 is a view similar to Fig. 8 showing the relationship of the parts at the end of a stitching operation with the locking means being operated by the movable rack to release the rock-shaft carrying the step-feed rolls.

Rocking motion of the locking member 213 actuates a cam-plate 282 for moving the actuating pawl 269 and check pawl 275 out of engagement with the teeth 271 on the ratchet-wheel 268, see Figs. 17 and 18. As illustrated in Fig. 18 the cam-plate 282 is positioned adjacent the ratchet-wheel 268 on the control shaft 154 and has an upwardly extending arm 287 and a depending arm 284 with a pin 283 projecting laterally therefrom. As illustrated in Fig. 17, the cam-plate 282 underlies the edges of the pawls 269 and 275 overhanging the sides of the ratchet-wheel 268 and has lobes 285 and 286 for lifting the pawls out of engagement with the ratchet-wheel 268. A spring 288 connected to the upwardly-extending arm 287 normally rocks the plate 282 to its inoperative position illustrated in Fig. 9 and its movement is limited by engagement with a pin 302 projecting from the bed-block 232. With the cam-plate 282 in the position illustrated in Fig. 9 the lobes 285 and 286 are positioned at the rear of the actuating pawl 269 and check pawl 275.

The cam-plate 282 is rocked in a counter-clockwise direction from the position illustrated in Fig. 9 to that illustrated in Fig. 17 against the action of the spring 288 by means of a link 289 to cause the lobes 285 and 286 to lift the actuating pawl 269 and check pawl 275 out of engagement with the ratchet-wheel 268. The link 289 is connected at its forward end to the pin 283 on the depending arm 284 of the cam-plate 282 and at its opposite end to a lever 291 pivoted for rocking movement on a pin 292. As illustrated in Fig. 17, the link 289 has a slot 293 embracing the pin 283 to provide lost motion between the actuation of the locking member 213 and cam-plate 282 and a depending button 281 for a purpose to be described later. The lever 291 has a slot 293 intermediate its ends through which a laterally-projecting pin 294 at the lower end of the pendantly mounted locking lever 213 extends. Thus, actuation of the pendantly mounted locking lever 213 from the position shown in Fig. 9 to that shown in Fig. 17 rocks the lever 291 and, operating through the link 289, rocks the cam-plate 282 to lift the actuating pawl 269 and check pawl 275 out of engagement with the ratchet-wheel 268 at the end of a stitching operation. The clock-spring 251 acting on the control shaft 154 then rotates the latter and the pinion gear 247 to return the rack 230 to its initial position, the return movement of the rack being limited by its engagement with the abutment 239.

To retain the cam-plate 282 in operative position to maintain the actuating pawl 269 and check pawl 275 out of engagement with the ratchet-wheel 268 during the return movement of the rack 230 an automatically operable detent 295 is provided which is movable into engagement with the forward edge of the depending arm 284 of the cam-plate. As illustrated in Figs. 4, 18, 22 and 23 the detent 295 is in the form of a right-angular plate having a horizontal flange 296 positioned in a slot 297 in the bed-block 232 below the rack 230 and rod 240 and a vertical flange 298 at the front of the slot. The detent 295 is pivoted on a screw 299 and is normally urged outwardly from the slot 297 by a spring-pressed plunger 300, see Fig. 22. With the cam-plate 282 in the position illustrated in Fig. 8, its depending arm 284 overlies the vertical flange 298 of the detent as illustrated in Figs. 4 and 18 to hold it in inoperative position. When the cam-plate 282 is rocked to the position illustrated in Fig. 17, however, the detent is moved outwardly from the slot 297 by the spring-pressed plunger 300 to position the edge 301 of its vertical flange 298 in front of the depending arm 284 to hold the cam-plate in operative position while rack 230 is being retracted.

The detent 295 is operated from the rack 230 at the end of its return movement through intermediate mechanism to cause it to release the cam-plate 282 whereby the latter is rocked to its inoperative position by the spring 288. To this end a lever 305 is pivotally mounted on the abutment 239 in position to be engaged by the forward end of the rack 230, see Figs. 22 to 25. The lever 305 is pinned to a shaft 306 extending vertically through a bearing in the abutment 239 and the shaft has a crank-arm 307 at its lower end with a crank-pin 308 depending therefrom. The crank-pin 308 seats in a recess 309 of a rockable member 310 mounted for sliding movement on a square shaft 311. The square shaft 311 is journaled at its ends in suitable bearings 312 and 313 and has a laterally projecting lug 314 engageable with the vertical flange 298 of the detent 295. Thus, rocking movement of the lever 305 by the rack 230 at the end of its return movement operates through the shaft 306, crank-arm 307, pin 308, member 310, square shaft 311 and lug 314 to press the detent 295 into the slot 297 against the action of the spring-pressed plunger 300. The cam-plate 282 is then rocked from the position shown in Fig. 17 back to its initial position illustrated in Fig. 8 by the spring 288 and thereafter overlies the flange 298 of the detent 295 to hold it in its inoperative position illustrated in Figs. 4 and 18.

Tie-stitch mechanism

Figure 35:
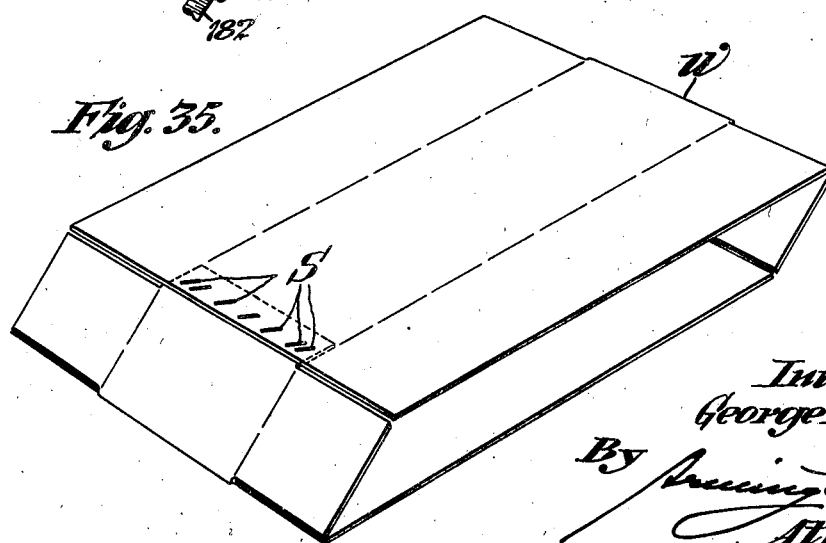
Fig. 35 is a perspective view of a carton stitched by the present machine and showing the angular relationship of the stitches with respect to the seam and the location of the tie-stitches at the opposite ends of the row of stitches.

The tie-stitch mechanism is provided for effecting a decrease in the increment of movement of the work W by the step-feed rolls 111 and 112 between certain stitches, i. e. the first two and last two stitches of a row as illustrated in Fig. 35. The tie-stitch mechanism comprises a cam 320, see Figs. 14 and 15, having a hub 321, shown in Fig. 4, rockably mounted on a sleeve 319 on the control shaft 154. The cam 320 is manually slidable axially of the control shaft 154 from its inactive position, illustrated in Fig. 4, to an operative position adjacent the flange 158 of the member 153, a spring-pressed detent 322 cooperating with annular recesses 323 and 324 in the sleeve 319 for releasably holding it in one of the other of its two positions. The cam 320 is in the form of a plate having a lobe 325, an adjacent inclined face 326 and a substantially radially-extending arm 327 as illustrated in Figs. 14 and 15. When the cam 320 is rocked to its operative position the lobe 325 underlies the overhanging end of the key 164 connecting the hub 156 of the crank-arm 155 to the flange 158 of the oscillating member 153 as previously described. As previously explained, the oscillating member 153 and crank-arm 155 are rocked together as a unit when the key 164 is seated in the slotted recess or seat 167 as illustrated in Fig. 15, but operated with lost motion when the key is lifted out of the seat by the lobe 325 of the tie-stitch cam 320 as shown in Fig. 14.

The means for operating the tie-stitch cam 320 comprises a square shaft 328 suitably journaled at one end in the bearing 312 and at its opposite end in a bearing 315, see Fig. 8, and having a crank-arm 329 and a link 330 connecting the crank-arm to the arm 327 of the tie-stitch cam, see Fig. 13. Intermediate its ends the square shaft 328 is provided with an upstanding lug 331 having a beveled cam face 332 at its upper end for a purpose as will appear later. Rocking movement of the square shaft 328 operating through the crank-arm 329 and link 330 will rock the tie-stitch cam 320 from the position illustrated in Fig. 14 to that illustrated in Fig. 15, or vice versa. The square shaft 328 is rocked by the rack 230 at the end of its return movement to move the tie-stitch cam 320 to the position illustrated in Fig. 14 through mechanism similar to that described for rocking the square shaft 311.

The mechanism for operating the square shaft 328 comprises a lever 333 mounted intermediate its ends on a vertical shaft 334 extending through a bearing in the abutment 239 and having a crank-arm 335 at its lower end with a crank-pin 336 seated in a rockable member 337 slidably mounted on the square shaft 328, see Figs. 22 to 26. A cam-plate 338 is mounted on the outer arm of the lever 333 and connected for rotation therewith by the shaft 334 and a removable screw 339. This provides that upon return movement of the rack 230 the lever 333 and shaft 334 connected thereto are rocked and, operating through the crank-arm 335, crank-pin 336, square shaft 328 and link 330 act to move the tie-stitch cam 320 to the position illustrated in Fig. 14, the inclined nose 340 of the cam-plate 338 entering the slot 237 in the side of the rack 230 as illustrated in Fig. 22. During the operation of the pitman 144 from the position shown in Fig. 8 to that shown in Fig. 9 the flange 158 of the oscillating member 153 rocks with respect to the hub 156 of the crank-arm 155 until the set-screw 169 carried by the flange engages the side of the key 164, thus permitting lost motion between the parts and a decrease in the normal movement of the step-feed rolls 111 and 112 during the return movement of the pitman. Consequently, the work W will be advanced to a slight extent only to permit a second stitch to be driven closely adjacent to the first stitch to provide a tie-stitch.

During the rotation of the shaft 23 to apply the second stitch the rack 230 will be advanced one tooth to engage the shoulder 238 at the rear of the slot 237 with the inclined nose 340 of the cam-plate 338 and thereby rock the latter to the position illustrated in Fig. 25. Consequently, the vertical shaft 334 and square shaft 328 will likewise be rocked to transmit motion through the link 330 to move the tie-stitch cam 320 to its inoperative position shown in Fig. 15. During the return movement the flange 158 of the oscillating member 153 the spring 166 will rock the key 164 to seat its end in the slotted recess or seat 167 of the oscillating member 153 whereby the step-feed rolls 111 and 112 will thereafter operate to advance the work W regular increments of movement.

As the stitching operation continues and the rack 230 is moved to rock the depending locking member 213 to the position illustrated in Fig. 13 the button 281 on the link 289 will engage the cam-face 332 on the lug 331 projecting from the square shaft 328 to rock the latter in the manner previously explained. Rocking movement of the square shaft 328 actuates the tie-stitch cam 320 to lift the end of the key 164 out of the slotted recess or seat 167 of the oscillating member 153. During the return stroke of the pitman 144 the step-feed rolls 111 and 112 will be operated to advance the work W with a decreased increment of movement and upon the next revolution of the driven shaft 23 a staple s is driven closely adjacent the previously driven staple to provide a tie-stitch at the last end of the row of stitches.

It will be noted by reference to Fig. 13 that the slot 290 in the link 289 provides for operation of the square shaft 328 without operating the cam-plate 282 for releasing the actuating and check pawls 268 and 275. Upon the return movement of the rack 230 the inclined face 341 of the nose 340 of the cam-plate 338 is in position to be engaged by the beveled end of the rack to thereby rock the cam-plate outwardly to the position illustrated in Fig. 25. However, engagement of the forward end of the rack 230 with the lever 333 immediately rocks the latter back to the position illustrated in Fig. 22. By this means the tie-stitch cam 320 is automatically operated by the movement of the rack 320 to decrease the spacing between adjacent stitches at the beginning and end of a row to provide a tie-stitched seam on the carton W as illustrated in Fig. 35.

If it is desired to operate the machine to stitch the seam of a carton W without a tie-stitch the cam 320 is shifted along the shaft 154 to its inactive position illustrated by full lines in Fig. 4 and the cam-plate 338 is rocked to its inactive position illustrated in Fig. 26. For this purpose the cam-plate 338 is provided with a second hole 342 through which the screw 339 may be inserted and screwed into the outer arm of the lever 333 to retain the cam-plate in inoperative position.

Method of operation of complete machine

To adapt the machine to stitch a particular type of carton the work-guides 14 are first adjusted on the table 12 to aline the seam to be stitched with the driver 19 of the stitcher-head 20, see Fig. 1. The work-operated gauge 70 is also adjusted by loosening the screw 94, see Figs. 28 and 30, and sliding the block 90 along the movable plate 73 to set the depending gate 86 in position to be engaged by the end of the carton W when the end of the flap to be stitched is alined with the driver 19 of the stitcher-head, see Figs. 3 and 27 to 31.

To adjust the control means to adapt the machine to apply a predetermined number of stitches S during a stitching operation the abutment 239 is released by means of the nut 246, see Figs. 22 and 23, and the rack 230 is moved to any desired position of adjustment by turning the dial 259 to rotate the control shaft 154; the graduations 262 on the dial indicating the number of stitches to be driven, see Fig. 20. Rotation of the dial 259, operating through the control shaft 154 and pinion gear 247 which meshes with the rack 230, moves the latter with respect to the stopping member 59 shown in Fig. 17. The abutment 239 is then brought into engagement with the front end of the rack 230 and clamped in adjusted position by turning the nut 246.

To adjust the normal spacing of the stitches S the set-screw 182 is turned to move the block 179 carrying the crank-pin 180 along the slotted crank-arm 178 of the one-way clutch 146, see Fig. 8, to vary the effective length of the crank-arm and thereby the increment of angular movement of the step-feed rolls 111 and 112 during one complete revolution of the driven shaft 23.

To adjust the extent of rocking motion of the cradle 121 to correspond to the thickness of the particular carton to be stitched the block 192 carrying the pin 201 for pivotally connecting the crank-arm 188 on the rock-shaft 123 and operating lever 196, see Figs. 9 and 11, is moved along the grooved guideway 193 in the crank-arm and clamped in adjusted position by the nut 210; the location of the pivot pin 201 on the arm 188 controlling the extent of rocking motion of the cradle.

If the carton is to be stitched with a tie-stitch at each end of the row of stitches the tie-stitch cam 320 is shifted manually from its inactive position shown by full lines in Fig. 4 to its operative position illustrated by dash lines in this view to cause it to underlie the overhanging end of the key 164. The cam-plate 338 is adjusted on the operating lever 333 to the position illustrated in Figs. 22 and 25. The machine is then ready for a stitching operation.

Engagement of the depending gate 86 of the gauge 70 by the edge of the carton W causes the plates 73 to be moved with respect to the fixed plate 71 from the position illustrated in Fig. 28 to that illustrated in Fig. 29, thereby closing the contacts 75 and 76 of the electric circuit 109 illustrated in Fig. 34 to energize the solenoid 50. Energization of the solenoid 59 draws the plunger 51 thereinto, which, acting through the link 52, lever 48 and bell-crank 44, illustrated in Fig. 5, withdraws the control pin 40 from the clutch 39 to couple the flywheel-pulley 33 to the driven shaft 23. Upon movement of the link 52 from the position shown in full lines to that shown in dotted lines in Fig. 6 the stopping member 59 is rocked by the spring 67 to engage the latching shoulder 56 of the arm 55 carried thereon with the pin 57 on the link to thereby hold the control pin 40 withdrawn from the clutch 39.

Rotation of the shaft 23 driven by the motor 16 through the belt 38 and flywheel-pulley 33 operates the stitcher-head 20 to form and drive a staple s into the work W during the first half revolution of the shaft. During the operation of the stitcher-head 20 the projection 107 moving with the staple-former 18 actuates the lever 106 positioned thereunder to rock the square shaft 100 carried by the gauge 70, see Fig. 27, which, in turn, rocks the latching member 97 to disengage its ear 96 from the shoulder 98 on the gate 86 thereby permitting the latter to pivot and ride over the work W, see Fig. 33.

Simultaneously with the operation of the stitcher-head 20 the pitman 144 is reciprocated by the eccentric 147 on the driven shaft 23 from the position illustrated in Fig. 8 to that illustrated in Fig. 9. This motion of the pitman 144 causes its roller 152 to act on the arm 197 of the lever 196 to rock the latter and thereby the crank-arm 188 which rocks the rock-shaft 123 and cradle 121 mounted thereon to engage the step-feed rolls 111 and 112 with the work W, see Fig. 3. Upon rocking movement of the lever 196 the arm 212 carried by the countershaft 194 is engaged by the recessed plate 219 on the pendantly mounted locking lever 213 to hold the rock-shaft 123 with the cradle 121 in the position illustrated in Fig. 3.

Simultaneously with the operation of the rock-shaft 123 the oscillating member 153 is rocked in a counter-clockwise direction, as viewed in Fig. 9, and the actuating pawl 269 carried by the plate 157 turns the ratchet-wheel 268 and control shaft 154 to which it is keyed through a predetermined arc. The pinion 247 keyed to the control shaft 154 transforms the rotary movement of the shaft to a longitudinal translation of the rack 230, the construction being such that the rack is advanced one tooth.

Due to the interlocking engagement of the flange 158 of the oscillating member 153 with the crank-arm 155, by means of the key 164, the crank-arm is rocked with the oscillating member as a unit to the position illustrated in Fig. 9. Motion of the crank-arm 155 is transmitted through the link 181 to the crank-arm 178 of the member 174 of the one-way clutch 146 which moves relative to the housing 175 during the first half revolution of the driven shaft 23 while a staple s is being driven by the stitcher-head 20. With the parts of the tie-stitch control mechanism in the relative positions illustrated in Fig. 22 the overhanging end of the key 164 rides onto the lobe 325, see Fig. 13, of the tie-stitch cam 320 adjacent the end of the forward stroke of the oscillating member 153 to lift the key out of the slotted recess or seat 167 to disconnect the crank-arm 155 from the oscillating member 153.

During the second half revolution of the driven shaft 23 to move the pitman 144 from the position illustrated in Fig. 9 to that illustrated in Fig. 8 the actuating pawl 269 carried by the oscillating member 153 rides over the teeth 271 of the ratchet-wheel 268 while the latter is held by the check pawl 275. During its return stroke the oscillating member 153 rocks with respect to the crank-arm 155 until the set-screw 169 carried by the flange 158 engages the side of the key 164 as illustrated in Fig. 14 to provide lost motion and thereafter the crank-arm and oscillating member rock as a unit. Due to the arrangement of the rollers 176 in the clutch 146 the housing 175 keyed to the shaft 133 is turned during the return movement of the member 174 and, operating through the intermeshing gears 138 and 139, coupling rods 134 and 135 and shafts 115 and 119 it rotates the step-feed rolls 111 and 112 to advance the work W a predetermined increment of movement less than the normal spacing of the staples whereby the second staple s will be driven closely adjacent the first staple to provide a tie-stitch at the beginning of the row of stitches, see Fig. 35. It will be observed that the work W is advanced by the step-feed rolls 111 and 112 during the second half of a revolution of the driven shaft 23 or, in other words, in timed relation to the stitching mechanism which drives a staple during the first half of a revolution of the driven shaft.

During the driving of the second staple s the shoulder 238 at the forward end of the recess 237 in the rack 230 engages the inclined face 341 on the projecting nose 340 of the cam-plate 338 to rock the latter to the position illustrated in Fig. 25. Rocking movement of the cam-plate 338 is transmitted through the lever 333, vertical shaft 334, crank-arm 335, rockable member 337, square shaft 328, crank-arm 329 and link 330, see Figs. 22 to 25, to thereby rock the tie-stitch cam 320 to its inoperative position, illustrated in Fig. 15. This brings the lug 331 on the square shaft 328 into position to be later engaged by the depending button 281 on the link 289, see Fig. 13. Thus, during the forward stroke of the oscillating member 153 and the driving of the second staple s the spring 166 rocks the key 164 carried by the crank-arm 155 to cause its ends to engage in the slotted recess or seat 167 in the flange 158 of the oscillating member. The oscillating member 153 and crank-arm 155 are thereby connected to thereafter oscillate as a unit to space the stitches S the normal distance apart.

The machine continues to operate in the manner as explained above to apply the staples s, advance the work W to space the staples and feed the rack 230 forwardly one tooth for each staple driven until next to the last stitch. At this juncture the rack 230 will have been moved to the position illustrated in Fig. 13 to engage the pendantly mounted locking member 213 and move the latter to a slight extent. This slight rocking movement of the locking member 213 is transmitted to the lever 291 and through the link 289 to cause the depending button 281 thereon to engage the cam-face 332 on the lug 331 projecting from the square shaft 328 whereby to rock the latter, see Fig. 13; the slot 290 in the link permitting movement thereof relative to the cam-plate 282. Rocking motion of the square shaft 328 and crank-arm 329 thereon operates through the link 330 to rock the tie-stitch cam 320 to its operative position illustrated in Figs. 13 and 14. In this manner the step-feed rolls 111 and 112 are operated with a decreased increment of movement due to the lost motion between the oscillating member 153 and crank-arm 155 to space the last stitch S closely adjacent the next to the last one to provide a tie-stitch at the end of the row of stitches as illustrated in Fig. 35.

Upon the application of the last staple s the rack 230 will have been moved to the position illustrated in Fig. 17 to operate the pendantly mounted locking member 213 and rockably mounted stop member 59. The arm 212 and operating lever 196 are thus released and the spring 187 operates to rock the cradle 121 in a clockwise direction, as viewed in Fig. 3, together with the rock shaft 123 but under the control of the roller 152 on the pitman 144 illustrated in Fig. 17. This latter rocking motion of the cradle 121 engages the discharge rollers 113 and 114 with the work W to feed it from the machine, the shaft 60 carrying the rolls 113 being continuously driven from the flywheel-pulley 33 by means of the chain 184 and sprockets 35 and 63.

The motion of the locking member 213 is also transmitted through the link 289 and the pin 283 and slot 290 connection to rock the cam-plate 282 to the position illustrated in Fig. 17. The detent 295 is then forced outwardly by the spring-pressed plunger 300, see Figs. 22 and 23, to position the edge 301 of its vertical flange 298 in front of the depending arm 284 of the cam-plate to latch it in the position illustrated in Fig. 17. The lobe 286 of the cam-plate 282 when in the position illustrated in Fig. 17 lifts the check pawl 275 out of engagement with the teeth 271 of the ratchet-wheel 268 and the lobe 285 is then in position to be engaged by the actuating pawl 269. During the return stroke of the oscillating member 153 after the last staple s has been driven the actuating pawl 269 rides over the lobe 285 and is lifted out of engagement with the teeth 271 on the ratchet-wheel 268 to release the control shaft 154. The clock-spring 251, see Fig. 18, then rotates the control shaft 154 in a clockwise direction, as viewed in Fig. 23, to automatically return the rack 230 to its initial position illustrated in Fig. 8. The engagement of the forward end of the rack 230 with the lever 305 on the abutment 239 operates through the shaft 306, crank-arm 307, crank-pin 308, rockable member 310, square shaft 311 and lug 314 thereon to actuate the detent 295 to release the cam-plate 282, see Figs. 4, 22 and 23. Upon release of the cam-plate 282 by the detent 295 the spring 288 operates to rock the cam-plate to its inoperative position illustrated in Fig. 8, whereby the actuating pawl 269 and check pawl 275 are again engaged with the teeth 271 of the ratchet-wheel 268.

Simultaneously with the operation of the lever 305, the lever 333 of the operating means for the tie-stitch cam 320 is rocked to the position illustrated in Fig. 22, and operating through the vertical shaft 334, crank-arm 335, crank-pin 336, rockable member 337, square shaft 328, crank-arm 329 and link 330 it rocks the tie-stitch cam 320 to the position illustrated in Fig. 14.

Actuation of the stopping member 59 rocks its bearing 62 carrying the latching arm 55, see Fig. 5, to cause its shoulder 56 to be moved to the position illustrated by full lines in Fig. 6 to release the pin 57 projecting laterally from the link 52. When the link 52 is released by the latching arm 55 the spring 41 acts to force the pin 40 into the clutch 39. The clutch 39 is so constructed and arranged that upon rotation of the driven shaft 23 to a position where the former 18 and driver 19 of the stitcher-head 20 have been moved to their uppermost position the pin is effective to operate the clutch to uncouple the flywheel-pulley 33 from the driven shaft. Thus the machine comes to rest at the end of a stitching operation with the parts returned to their initial position to commence another stitching operation.

It will be observed from the foregoing description that the present invention provides a novel construction and arrangement of elements in a stitching machine whereby the operation of the machine is initiated by the insertion of the work and the machine thereafter caused to operate automatically to apply a predetermined number of staples by feeding the work in timed relation to the driving of the staples. The mechanism also acts automatically to discharge the work after a complete cycle of operations and to arrest the operation of the machine with the parts restored to their initial position. It will be observed also that the present invention provides a novel form of control means for actuating the stopping means of the machine which may be easily and quickly adjusted to adapt the machine to apply any desired number of staples during a stitching operation. It will be observed further that the construction and arrangement of the parts in the present machine provide for facility of adjustment of the elements to adapt it to be easily and quickly set for use with different forms and shapes of cartons.

While a preferred embodiment of the invention is herein described and illustrated, it is to be understood that modifications may be made in the structure and arrangement of the parts of the machine without departing from the spirit or scope of the invention. Therefore, without limiting myself in this respect, I claim:

1. In a machine of the type indicated, wire-stitching means, work-feeding means, means for initiating operation of the wire-stitching means, stopping means for arresting the operation of the wire-stitching means, control means operated in timed relation to the wire-stitching means for operating the work-feeding means and actuating the stopping means, and means for adjusting the control means to actuate the stopping means after any predetermined number of stitches have been applied to the work.

2. In a machine of the type indicated, rotary driving means, driven means, a clutch for connecting the driving and driven means, wire-stitching means operated by the driven means, control means operated by the driven means and having a longitudinally-movable rack, said control means translating the rotary motion of the driven means to longitudinal movement of the rack to disconnect the clutch, and means for adjusting the initial position of the rack to vary the extent of its longitudinal movement necessary to disconnect the clutch.

3. In a machine of the type indicated, wire-stitching means, work-feeding means, means for initiating the operation of the machine, stopping means for arresting the operation of the machine, and an oscillating member continuously operated in timed relation to the wire-stitching means and connected to operate the work-feeding means and stopping means.

4. In a machine of the type indicated, driving means, driven means, a clutch for connecting the driving and driven means, wire-stitching means operated by the driven means, a rack movable longitudinally to disconnect the clutch, means for initially adjusting the rack in relation to the clutch, and a gear operated from the driven means for actuating the rack toward the clutch to disconnect the same.

5. In a machine of the type indicated, driving means, a driven shaft, a clutch for connecting the driving means and driven shaft, wire-stitching means operated by the driven shaft, a rack movable longitudinally to disconnect the clutch, a gear for driving the rack, pawl-and-ratchet means operated by the driven shaft for intermittently rotating the gear to actuate the rack, and means for initially adjusting the rack to position it to control the period of operation of the wire-stitching means.

6. In a machine of the type indicated, driving means, a driven shaft, a clutch for connecting the driving means and driven shaft, wire-stitching means operated by the driven shaft, a rack movable longitudinally to disconnect the clutch, a gear for driving the rack, pawl-and-ratchet means for intermittently rotating the gear, eccentric means on the driven shaft for operating the pawl-and-ratchet means, and means for initially adjusting the rack to position it to control the period of operation of the wire-stitching means.

7. In a machine of the type indicated, driving means, a driven shaft, a clutch for connecting the driving means and driven shaft, wire-stitching means operated by the driven shaft, a rack movable to disconnect the clutch, a gear operated from the driven shaft for moving the rack, and means for adjusting the position of the rack whereby to control the period of operation of the wire-stitching means.

8. In a machine of the type indicated, driving means, a driven shaft, a clutch for connecting the driving means and driven shaft, work controlled means for operating the clutch to connect the driving means and driven shaft, means to disconnect the clutch, a rack movable to actuate the clutch-disconnecting means, a gear operated from the driven shaft for moving the rack, and means for adjusting the rack with respect to the clutch-disconnecting means whereby to control the period of operation of the wire-stitching means.

9. In a machine of the type indicated, wire-stitching means, means for initiating the operation of the wire-stitching means, stopping means for arresting the operation of the wire-stitching means, a movable member for actuating the stopping means, means for actuating the movable member predetermined increments of movement during each operation of the wire-stitching means, an abutment initially adjustable with respect to the stopping means, and means for returning the movable member into engagement with the abutment after the stopping means has been actuated.

10. In a machine of the type indicated, wire-stitching means, means for initiating the operation of the wire-stitching means, stopping means for arresting the operation of the wire-stitching means, a rack movable to actuate the stopping means, means for moving the rack predetermined increments during each operation of the wire-stitching means, an abutment engageable by the end of the rack, and means for initially adjusting the abutment with respect to the stopping means to adapt the rack to operate the stopping means after any predetermined number of stitches have been applied to the work.

11. In a machine of the type indicated, wire-stitching means, means for initiating the operation of the wire-stitching means, stopping means for arresting the operation of the wire-stitching means, a rack movable to actuate the stopping means, a gear operated intermittently from the wire-stitching means to advance the rack predetermined increments of movement, and means for initially adjusting the rack with respect to the stopping means to adapt it to actuate the latter after any predetermined number of stitches have been applied to the work.

12. In a machine of the type indicated, wire-stitching means, means for initiating the operation of the wire-stitching means, stopping means for arresting the operation of the wire-stitching means, a rack movable to actuate the stopping means, means for initially adjusting the rack in relation to the stopping means, a gear operated intermittently by the wire-stitching means for moving the rack predetermined increments whereby to operate the stopping means after a predetermined number of stitches have been applied to the work, and resilient means for returning the rack to initial position.

13. In a machine of the type indicated, wire-stitching means, means for initiating the operation of the wire-stitching means, stopping means for arresting the operation of the wire-stitching means, a rack movable to actuate the stopping means, a shaft overlying the rack, a gear on the shaft in mesh with the rack, means operated by the wire-stitching means for intermittently rotating the gear to move the rack predetermined increments, an abutment engageable by the end of the rack, means for initially adjusting the abutment with respect to the stopping means to adapt the rack to actuate the stopping means after any predetermined number of stitches have been applied to the work, and a spring for operating the gear after the stopping means has been actuated to return the rack into engagement with the abutment.

14. In a machine of the type indicated, wire-stitching means, means for initiating the operation of the wire-stitching means, stopping means for arresting the operation of the wire-stitching means, a rack movable to actuate the stopping means, a gear in mesh with the rack, ratchet-means operated from the wire-stitching means for intermittently rotating the gear to advance the rack predetermined increments of movement, and means for initially adjusting the rack with respect to the stopping means to adapt it to operate the latter after any predetermined number of stitches have been applied to the work.

15. In a machine of the type indicated, wire stitching means, means for initiating the operation of the wire-stitching means, stopping means for arresting the operation of the wire-stitching means, a rack movable to actuate the stopping means, a gear in mesh with the rack, means operated by the wire-stitching means for intermittently rotating the gear to advance the rack predetermined increments of movement, means for initially adjusting the rack with respect to the stopping means, and means connected to the gear to indicate the number of stitches applied to the work before the stopping means is actuated.

16. In a machine of the type indicated, wire-stitching means, means for initiating the operation of the wire-stitching means, stopping means for arresting the operation of the wire stitching means, a rack movable to actuate the stopping means, a gear meshing with the rack, pawl-and-ratchet means for intermittently rotating the gear, eccentric means operated by the wire-stitching means for actuating the pawl-and-ratchet means whereby to advance the rack a predetermined increment for each operation of the wire-stitching means, a graduated dial connected to rotate with the gear for indicating the position of the rack relative to the stopping means, and resilient means adapted to return the rack to initial position after the stopping means has been actuated.

17. In a machine of the type indicated, wire-stitching means, means for initiating the operation of the wire-stitching means, stopping means for arresting the operation of the wire-stitching means, a rack movable to operate the stopping means, a control shaft, a gear on the control shaft in mesh with the rack, means operated from the wire-stitching means for intermittently rotating the control shaft to advance the rack predetermined increments of movement, a dial on the control shaft for indicating the relative position of the rack with respect to the stopping means, an adjustable abutment engageable with the rack in its initial position of adjustment, and a spring for rotating the control shaft to return the rack into engagement with the abutment after the stopping means has been actuated.

18. In a machine of the type indicated, wire-stitching means, means for initiating the operation of the wire-stitching means, stopping means for arresting the operation of the wire-stitching means, a rack movable to actuate the stopping means, a gear for operating the rack, pawl-and-ratchet means operated from the wire-stitching means for intermittently rotating the gear to advance the rack predetermined increments, means operated by the rack for disengaging the pawl from the ratchet-means, and means for returning the rack to initial position.

19. In a machine of the type indicated, driving means, a driven shaft, a clutch, means for actuating the clutch to couple the driving means with the driven shaft, wire-stitching means operated by the driven shaft, means for uncoupling the clutch, a rack movable to operate the clutch-uncoupling means, a gear in mesh with the rack, means operated from the wire-stitching means for intermittently rotating the gear to advance the rack predetermined increments of movement, means for initially adjusting the rack with respect to the clutch-uncoupling means whereby to cause the latter to be operated after a predetermined number of stitches have been applied to the work, and means for returning the rack to initial position after the clutch-uncoupling means has been actuated.

20. In a machine of the type indicated, a prime mover, wire-stitching means, means for intermittently feeding work to the wire-stitching means, a clutch for connecting the prime mover with the wire-stitching means and work-feeding means, an electromagnet actuated means for operating the clutch, an electric circuit for energizing the electromagnet, a work-actuated gauge for closing the circuit, means for latching the clutch-operating means, and means actuated by the driven means for operating the latching means to release the clutch-operating means.

21. In a machine of the type indicated, a prime mover, wire-stitching means, a clutch for connecting the prime mover with the wire-stitching means, an electromagnet for actuating the clutch, an electric circuit including a work-actuated switch for energizing the electromagnet, clutch disconnecting means, a movable member for operating the clutch-disconnecting means, means actuated intermittently from the wire-stitching means for advancing the movable member predetermined increments of movement, and means for adjusting the movable member with respect to the clutch-disconnecting means whereby to cause the latter to be operated after a predetermined number of stitches have been applied to the work.

22. In a machine of the type indicated, wire-stitching means, means adjustable for controlling the operation of the wire-stitching means to apply a predetermined number of stitches to the work, means for intermittently feeding the work predetermined increments of movement in timed relation to the operation of the wire-stitching means, and tie-stitch means operative on the feeding means to vary the increment of movement of the work between certain stitches.

23. In a machine of the type indicated, wire-stitching means, means adjustable for controlling the operation of the wire-stitching means to apply a predetermined number of stitches to the work, means for intermittently feeding the work predetermined increments of movement in timed relation to the operation of the wire-stitching means, and tie-stitch means operative on the feeding means to vary the increment of movement of the work between the stitches of the first and last pair in the series.

24. In a machine of the type indicated, wire-stitching means, means adjustable for causing the wire-stitching means to apply a predetermined number of stitches to the work, means for intermittently feeding the work predetermined increments of movement in timed relation to the operation of the wire-stitching means, means for adjusting the feeding means to alter the increment of movement of the work between the stitches, and tie-stitch means operative on the feeding means to decrease the increment of movement of the work by the feeding means between certain stitches.

25. In a machine of the type indicated, wire-stitching means, means for operating the wire-stitching means to apply a predetermined number of stitches to the work, work-feeding means, an oscillating member for operating the work-feeding means in timed relation to the operation of the wire-stitching means, and tie-stitching means operative to alter the extent of movement of the oscillating member to vary the spacing between certain stitches.

26. In a machine of the type indicated, wire-stitching means, means for operating the wire-stitching means to apply a predetermined number of stitches to the work, work-feeding means, a member oscillated through a predetermined arc by the operating means for the wire-stitching means, a second oscillating member connected to operate the work-feeding means, means for connecting said members to oscillate as a unit or with lost motion therebetween, and means for controlling the last-named means.

27. In a machine of the type indicated, wire-stitching means, means for operating the wire-stitching means to apply a predetermined number of stitches to the work, work-feeding means, relatively movable members connecting the operating means for the wire-stitching means with the feeding means for intermittently operating the latter in timed relation to the operation of the wire-stitching means, and means for controlling the relative movement between said connecting members.

28. In a machine of the type indicated, wire-stitching means, means for operating the wire-stitching means to apply a predetermined number of stitches to the work, work-feeding means, a member driven by the operating means for the wire-stitching means, a member connected to operate the feeding means, selective interlocking means on said members for operating the feeding means in timed relation to the operation of the wire-stitching means to advance the work a shorter or a longer increment of movement, and means for controlling the engagement of the interlocking means on the members.

29. In a machine of the type indicated, wire-stitching means, means for operating the wire-stitching means to apply a predetermined number of stitches to the work, work-feeding means, an oscillating member driven by the operating means for the wire-stitching means, a second oscillating member connected to operate the feeding means, selective interlocking means for connecting said members to cause them to oscillate as a unit or with lost motion therebetween, and means for controlling the engagement of the interlocking means with the members.

30. In a machine of the type indicated, wire-stitching means, means for operating the wire-stitching means to apply a predetermined number of stitches to the work, work-feeding means, an oscillating member driven by the operating means for the wire-stitching means, a second oscillating member connected to operate the feeding means, a key for connecting said members to cause them to oscillate as a unit, adjustable abutments on the members engageable to operate one from the other with lost motion when the key is withdrawn, and means for controlling the position of the key.

31. In a machine of the type indicated, wire-stitching means, means for operating the wire-stitching means to apply a predetermined number of stitches to the work, work-feeding means, stopping means for arresting the operation of the wire-stitching means, a member driven by the operating means for the wire-stitching means, a member connected to operate the feeding means, selective interlocking means on said members for operating the feeding means in timed relation to the operation of the wire-stitching means to advance the work a shorter or longer increment of movement between stitches, a movable member for actuating the stopping means, and means actuated by the movable member for controlling the engagement of the interlocking means.

32. In a machine of the type indicated, wire-stitching means, work-feeding means, stopping means for arresting the operation of the wire-stitching means, a member movable to actuate the stopping means, means for adjusting the movable member with respect to the stopping means whereby to cause the stopping means to be actuated after a predetermined number of stitches have been applied to the work, and tie-stitch means operative on the feeding means to decrease the spacing between certain stitches.

33. In a machine for stitching together the folded sides of carton-blanks, wire-stitching means, means for intermittently feeding the work in timed relation to the operation of the wire-stitching means, means for supporting the blank to be stitched, an abutment for engaging the forward edge of the carton blank at opposite sides of the seam to be stitched to square the folded sides with the body portion of the blank prior to a stitching operation, means for holding the abutment in operative position, and means operated by the wire-stitching means during its first stroke to release the abutment to permit the feeding means to advance the work past the abutment.

34. In a machine for stitching together the folded sides of carton-blanks, wire-stitching means, means for supporting a blank in position to be stitched, a squaring member for engaging the forward edge of the carton-blank to square the folded sides with the body-portion of the latter and aline the seam to be stitched with the wire-stitching means, means for mounting the squaring member for adjustment relatively of the wire-stitching means, and means operated by the wire-stitching means during its first stroke to release the squaring member to permit the carton blank to pass thereunder.

35. In a machine of the type indicated, wire-stitching means, a work-operated gauge for controlling the operation of the wire-stitching means, said gauge having a depending gate mounted for rocking and longitudinal sliding movement, a latch for holding the gate in position to be engaged by the work to cause it to slide to initiate operation of the wire-stitching means, and means operated by the movement of the wire-stitching means for operating the latch to release the gate to adapt it to rock to permit the work to pass thereunder.

36. In a machine of the type indicated, wire-stitching means, an electric circuit including an electromagnet for initiating the operation of the wire-stitching means, and a work-operated gauge for controlling the electric circuit comprising a fixed plate having a switch thereon, a movable plate having an abutment for operating the switch, and a depending gate on the movable plate engageable by the work, said work sliding the movable plate with respect to the fixed plate to close the switch whereby to energize the electromagnet to initiate operation of the wire-stitching means.

37. In a machine of the type indicated, wire-stitching means, an electric circuit including an electromagnet for initiating operation of the wire-stitching means, and a work-operated gauge for controlling the electric circuit comprising a fixed plate having a switch thereon, a movable plate having an abutment for operating the switch, a depending gate pivotally mounted on the movable plate and having a squaring plate engageable by the work, a latch for holding the depending gate in position to be engaged by the work, the work acting to slide the movable plate with respect to the fixed plate to close the switch whereby to energize the electromagnet to initiate operation of the wire-stitching means, and means operated by the wire-stitching means to operate the latch to release the gate for rocking movement to permit the work to pass thereunder.

38. In a machine of the type indicated, a prime mover, wire-stitching means, means for feeding work to the wire-stitching means, a clutch for connecting the prime mover to the wire-stitching means and work-feeding means, clutch-operating means normally operative to disengage the clutch, an electromagnet for actuating the clutch-operating means to engage the clutch, an electric circuit for energizing the electromagnet, a work-operated gauge for closing the circuit, means for latching the clutch-operating means, means operative to release the work-actuated gauge and open the circuit after the clutch-operating means has been latched, and means for releasing the clutch-latching means.

39. In a machine of the type indicated, wire-stitching means, a rockable cradle having intermittently-operated step-feed rolls at one side and continuously operated discharge rolls at the other side, means for initiating operation of the wire-stitching means and rocking the cradle to engage the step-feed rolls with the work, means for arresting the operation of the wire-stitching means and rocking the cradle to engage the continuously operated discharge rolls with the work, a rack movable to operate the last-named means, and a gear meshing with the rack and operated in timed relation to the wire-stitching means.

40. In a machine of the type indicated, wire-stitching means, a rockable cradle having intermittently-operated step-feed rolls at one side and continuously operated discharge rolls at the other side, means for initiating operation of the wire-stitching means and rocking the cradle to engage the step-feed rolls with the work, means for arresting the operation of the wire-stitching means and rocking the cradle to engage the ocntinuously operated discharge rolls with the work, a rack movable to operate the last-named means, a gear meshing with the rack and operated in timed relation to the wire-stitching means, and means for initially adjusting the position of the rack with respect to the means for arresting the operation of the wire-stitching means.

41. In a machine of the type indicated, wire-stitching means, a rockable cradle having intermittently-operated step-feed rolls at one side and continuously operated discharge rolls at the other side, means for initiating operation of the wire-stitching means and rocking the cradle to engage the step-feed rolls with the work, means for arresting the operation of the wire-stitching means and rocking the cradle to engage the discharge rolls with the work, a rack movable to operate the last-named means, a control shaft overlying the rack and having a gear in meshing engagement therewith, pawl-and-ratchet means for intermittently operating the control shaft from the wire-stitching means to advance the rack, and means operated by the rack for disengaging the pawl-and-ratchet means to adapt the rack to be returned to initial position.

42. In a machine of the type indicated, wire-stitching means, a rockable cradle having intermittently-operated step-feed rolls at one side and continuously operated discharge rolls at the other side, means for normally rocking the cradle to engage the continuously operated discharge rolls with the work, means for rocking the cradle to engage the step-feed rolls with the work, means for latching the cradle in position to hold the step-feed rolls engaged with the work, and means operated by the wire-stitching means for actuating the latching means to release the cradle.

43. In a machine for stitching together the folded sides of carton blanks, wire-stitching means, means for supporting a blank in position to be stitched, a gauge for controlling the operation of the wire-stitching means, a sliding support for the gauge, a depending abutment pivotally mounted on the support for swinging movement and adapted to extend a substantial portion of the length of the forward edge of the carton, means for locking the abutment in vertical position to be engaged by the forward edge of the blank, said abutment acting to square the folded sides with the body portion of the blank and to properly position the latter to receive the first stitch, and means actuated by the wire-stitching means during the application of the first stitch to release the abutment for swinging movement to allow the carton to pass thereby.

GEORGE H. HARRED.